US012663283B2

(12) United States Patent
McGann et al.

(10) Patent No.: US 12,663,283 B2
(45) Date of Patent: Jun. 23, 2026

(54) CAPTURING LOCATION DATA FOR WAYPOINT

(71) Applicant: Apple Inc., Cupertino, CA (US)

(72) Inventors: Jared K. McGann, San Jose, CA (US); Qing Tao, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 626 days.

(21) Appl. No.: 18/059,325

(22) Filed: Nov. 28, 2022

(65) Prior Publication Data

US 2023/0358557 A1 Nov. 9, 2023

Related U.S. Application Data

(60) Provisional application No. 63/374,725, filed on Sep. 6, 2022, provisional application No. 63/339,879, filed on May 9, 2022.

(51) Int. Cl.
*G01C 21/36* (2006.01)
*H04W 4/021* (2018.01)

(52) U.S. Cl.
CPC ........ *G01C 21/3664* (2013.01); *H04W 4/021* (2013.01)

(58) Field of Classification Search
CPC ........................... G01C 21/3664; H04W 4/021
(Continued)

(56) References Cited

U.S. PATENT DOCUMENTS 6,024,655 A 2/2000 Coffee
6,259,381 B1 7/2001 Small
(Continued)

FOREIGN PATENT DOCUMENTS

CN 102098656 A 6/2011
CN 102868968 A 1/2013
(Continued)

OTHER PUBLICATIONS

Ludford, Pamela, J., et al., "Because I Carry My Cell Phone Anyway: Functional Location-Based Reminder Applications," CHI 2006 Proceedings, Apr. 22-27, 2006, Montreal, Quebec, Canada, pp. 889-898.
(Continued)

Primary Examiner — Mahmoud S Ismail
(74) Attorney, Agent, or Firm — Kilpatrick Townsend & Stockton LLP

(57) ABSTRACT

Approaches to provide location services are described. An example method may include receiving a request to display at least one waypoint user interface object on an electronic device user interface, sending a request to duty cycle waypoint information requests for the at least one waypoint user interface object, wherein the duty cycle has a first time period based on a motion classification, and where a waypoint information request comprises at least one of a positioning request or a bearing request, upon expiration of the first time period, performing at least one of determining not to wake an application processor based on receipt of waypoint information from another application during the time period, or coalescing the waypoint information request with other process requests, and receiving the waypoint information and displaying the received waypoint information on the electronic device user interface.

18 Claims, 13 Drawing Sheets

(58) Field of Classification Search
USPC ........................................................ 701/533
See application file for complete search history.

(56) References Cited

U.S. PATENT DOCUMENTS

| | | | |
|---|---|---|---|
| 6,542,814 | B2 | 4/2003 | Polidi et al. |
| 6,865,476 | B1 | 3/2005 | Jokerst, Sr. |
| 7,317,927 | B2 | 1/2008 | Staton et al. |
| 7,480,566 | B2 | 1/2009 | Laverty |
| 7,493,211 | B2 | 2/2009 | Breen |
| 7,561,063 | B2 | 7/2009 | Eckhart |
| 8,774,827 | B2 | 7/2014 | Scalisi et al. |
| 8,825,404 | B2 | 9/2014 | Mays |
| 8,995,322 | B2 | 3/2015 | Huang et al. |
| 9,210,545 | B2 | 12/2015 | Sabatelli et al. |
| 9,648,581 | B1 | 5/2017 | Vaynblat et al. |
| 9,741,191 | B1 | 8/2017 | Wong |
| 11,150,660 | B1 | 10/2021 | Kabirzadeh et al. |
| 2004/0203854 | A1 | 10/2004 | Nowak |
| 2005/0148340 | A1 | 7/2005 | Guyot |
| 2006/0223518 | A1 | 10/2006 | Haney |
| 2007/0143013 | A1 | 6/2007 | Breen |
| 2007/0219706 | A1 | 9/2007 | Sheynblat |
| 2008/0004043 | A1 | 1/2008 | Wilson et al. |
| 2008/0139219 | A1 | 6/2008 | Boeiro et al. |
| 2008/0186165 | A1 | 8/2008 | Bertagna et al. |
| 2008/0287151 | A1 | 11/2008 | Fjelstad et al. |
| 2009/0006566 | A1 | 1/2009 | Veeramachaneni et al. |
| 2009/0113340 | A1 | 4/2009 | Bender |
| 2009/0177384 | A1 | 7/2009 | Walder |
| 2010/0004005 | A1 | 1/2010 | Pereira et al. |
| 2010/0250727 | A1 | 9/2010 | King et al. |
| 2010/0279706 | A1 | 11/2010 | Dicke |
| 2010/0305842 | A1 | 12/2010 | Feng |
| 2010/0318293 | A1 | 12/2010 | Brush et al. |
| 2011/0051658 | A1 | 3/2011 | Jin et al. |
| 2011/0137813 | A1 | 6/2011 | Stewart |
| 2011/0238289 | A1 | 9/2011 | Lehmann et al. |
| 2012/0008526 | A1 | 1/2012 | Borghei |
| 2012/0054028 | A1 | 3/2012 | Tengler et al. |
| 2012/0095918 | A1 | 4/2012 | Jurss |
| 2012/0158283 | A1 | 6/2012 | Arastafar |
| 2012/0284769 | A1 | 11/2012 | Dixon et al. |
| 2012/0302256 | A1 | 11/2012 | Pai et al. |
| 2013/0099977 | A1 | 4/2013 | Sheshadri et al. |
| 2013/0178233 | A1 | 7/2013 | McCoy et al. |
| 2014/0045521 | A1 | 2/2014 | Grainger et al. |
| 2014/0195919 | A1* | 7/2014 | Wieder ................ H04L 67/306 |
| | | | 715/730 |
| 2015/0323341 | A1 | 11/2015 | Farrell et al. |
| 2015/0365803 | A1 | 12/2015 | Berger et al. |
| 2017/0086022 | A1 | 3/2017 | Beattie, Jr. et al. |
| 2017/0153118 | A1 | 6/2017 | Gum |
| 2020/0272221 | A1 | 8/2020 | Foster et al. |
| 2020/0333426 | A1* | 10/2020 | Dupray ................ G01S 5/0258 |
| 2020/0404448 | A1 | 12/2020 | Park et al. |
| 2021/0080260 | A1 | 3/2021 | Tremblay et al. |
| 2021/0321216 | A1* | 10/2021 | Connelly .............. H04L 65/612 |
| 2024/0370128 | A1* | 11/2024 | Wong .................... G06F 3/0481 |

FOREIGN PATENT DOCUMENTS

| | | | |
|---|---|---|---|
| DE | 102012208616 | A1 | 12/2012 |
| EP | 1387590 | A2 | 2/2004 |
| EP | 1777540 | A1 | 4/2007 |
| EP | 2759804 | A1 | 7/2014 |
| EP | 3402227 | A1 | 11/2018 |
| EP | 3940620 | A1 | 1/2022 |
| GB | 2491247 | | 11/2012 |
| JP | 2003207556 | A | 7/2003 |
| JP | 2009081865 | A | 4/2009 |
| JP | 2010288162 | A | 12/2010 |
| JP | 2011060065 | A | 3/2011 |
| WO | 0141468 | A2 | 6/2001 |
| WO | 0203093 | A1 | 1/2002 |
| WO | 2010048995 | A1 | 5/2010 |
| WO | 2011080622 | A1 | 7/2011 |
| WO | 2012031255 | A2 | 3/2012 |
| WO | 2012162192 | A1 | 11/2012 |
| WO | 2013059618 | A1 | 4/2013 |

OTHER PUBLICATIONS

Road-Ninja: Up-Close Mobile App Inspection, Kicking Tires, [online] [retrieved Mar. 12, 2012], 4 pages., retrieved from the Internet <URL: http://blogs.cars.com/kickingtires/2012/02/mobile-app-snapshot-road-n inj . . . >.

Aljohani et al., "Predicting At-Risk Students Using Clickstream Data in the Virtual Learning Environment", 12 pages.

U.S. Appl. No. 13/113,856, Final Office Action, Mailed on Nov. 7, 2012, 20 pages.

U.S. Appl. No. 13/113,856, Non-Final Office Action, Mailed on Jul. 18, 2012, 15 pages.

U.S. Appl. No. 13/488,430, Final Office Action, Mailed on May 8, 2013, 20 pages.

U.S. Appl. No. 13/488,430, Non-Final Office Action, Mailed on Dec. 5, 2012, 14 pages.

European Patent Application No. EP12168980.6, Extended European Search Report, Mailed on Sep. 21, 2012, 7 pages.

United Kingdom Patent Applicaton No. GB1209044.5 , "Combined Search and Examination Report", Aug. 24, 2012, 5 pages.

Japanese Patent Application No. JP2012-113725, Office Action, Mailed on May 27, 2013, 9 pages (4 pages of English translation and 5 pages of official language copy).

* cited by examiner

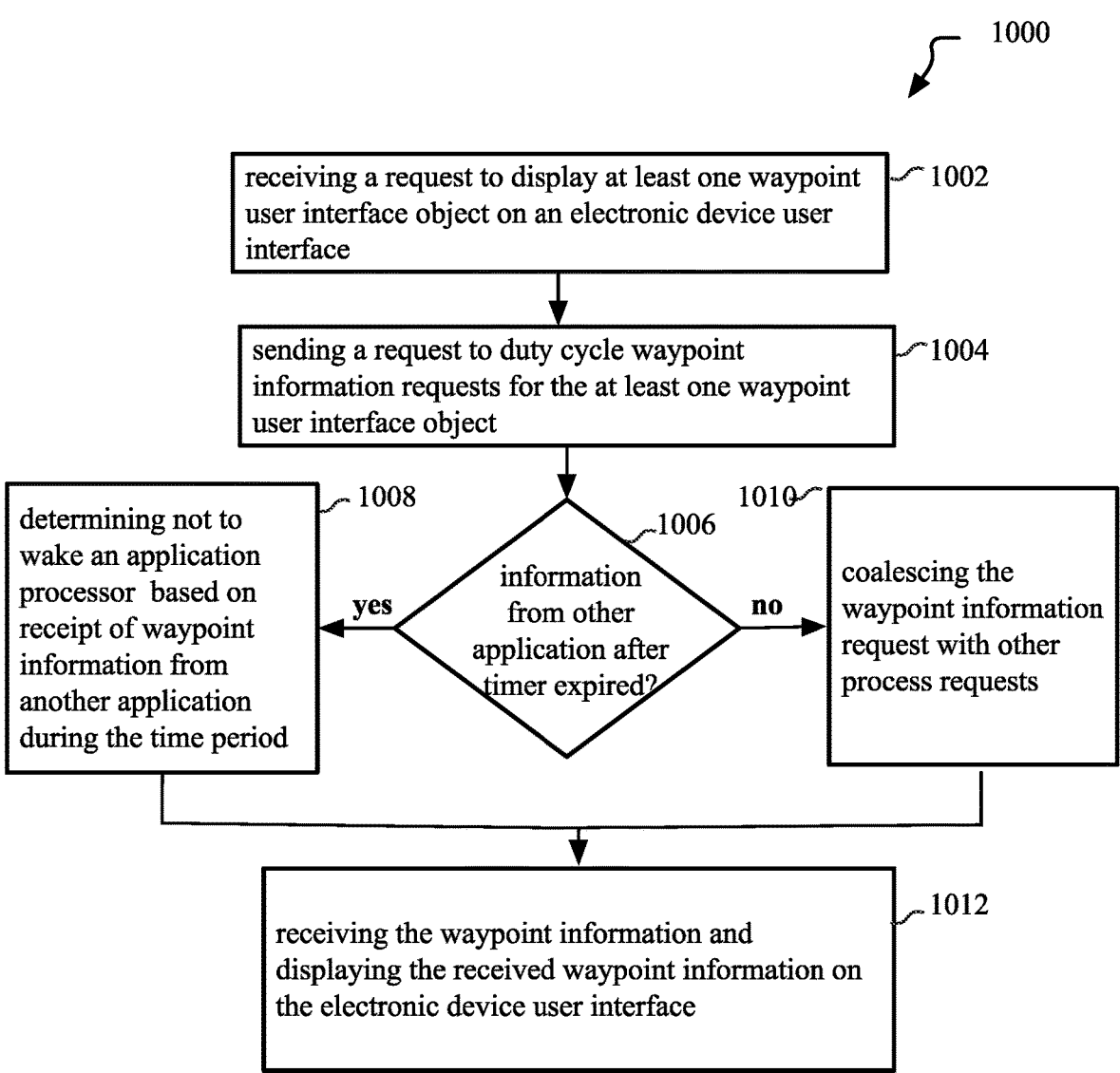

1000 receiving a request to display at least one waypoint user interface object on an electronic device user interface ⟿ 1002 sending a request to duty cycle waypoint information requests for the at least one waypoint user interface object ⟿ 1004

1008 determining not to wake an application processor based on receipt of waypoint information from another application during the time period

1006 information from other application after timer expired?

yes no

1010 coalescing the waypoint information request with other process requests receiving the waypoint information and displaying the received waypoint information on the electronic device user interface ⟿ 1012

*FIG. 10*

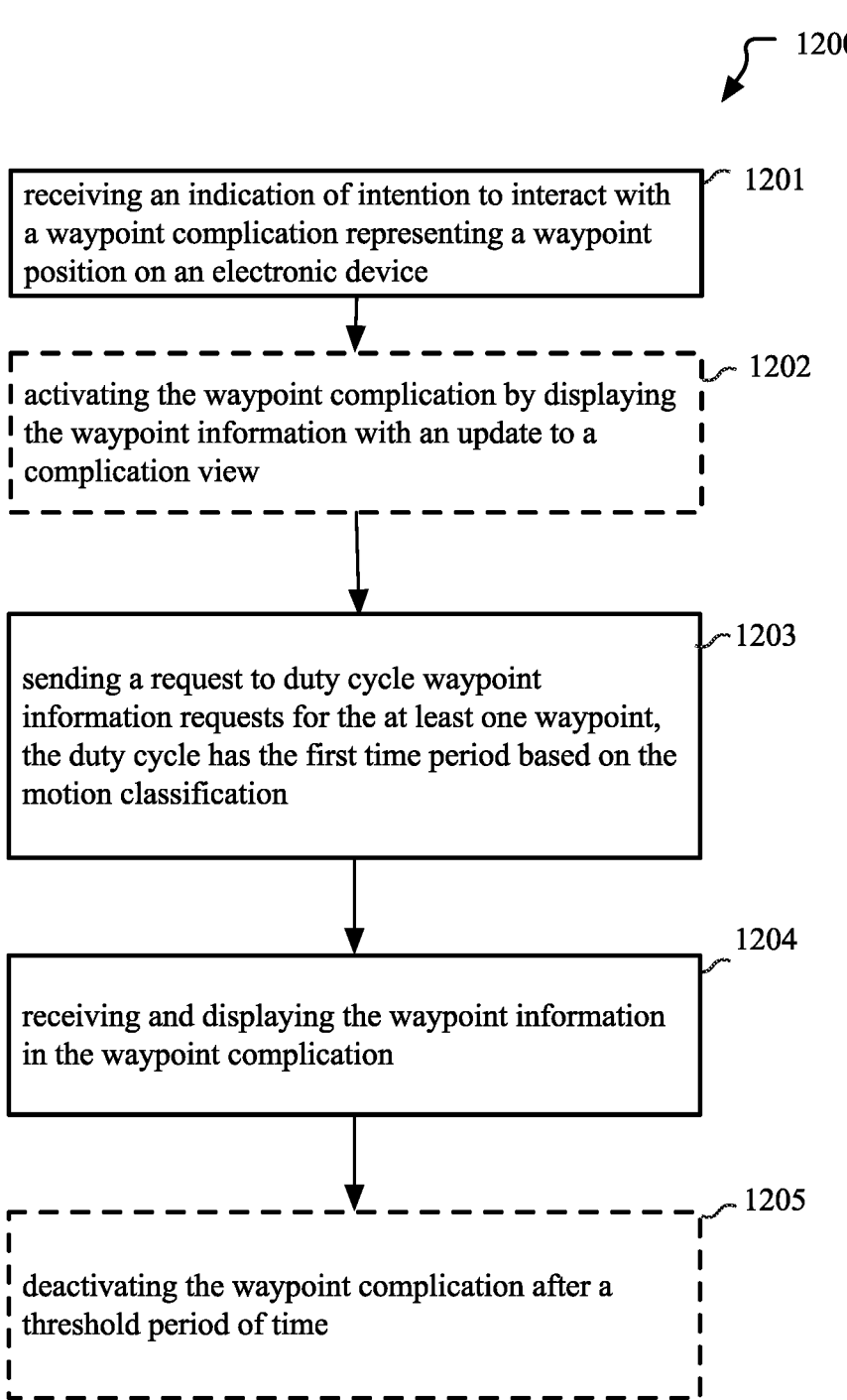

1200 receiving an indication of intention to interact with a waypoint complication representing a waypoint position on an electronic device — 1201 activating the waypoint complication by displaying the waypoint information with an update to a complication view — 1202 sending a request to duty cycle waypoint information requests for the at least one waypoint, the duty cycle has the first time period based on the motion classification — 1203 receiving and displaying the waypoint information in the waypoint complication — 1204 deactivating the waypoint complication after a threshold period of time — 1205

*FIG. 12*

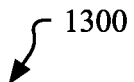
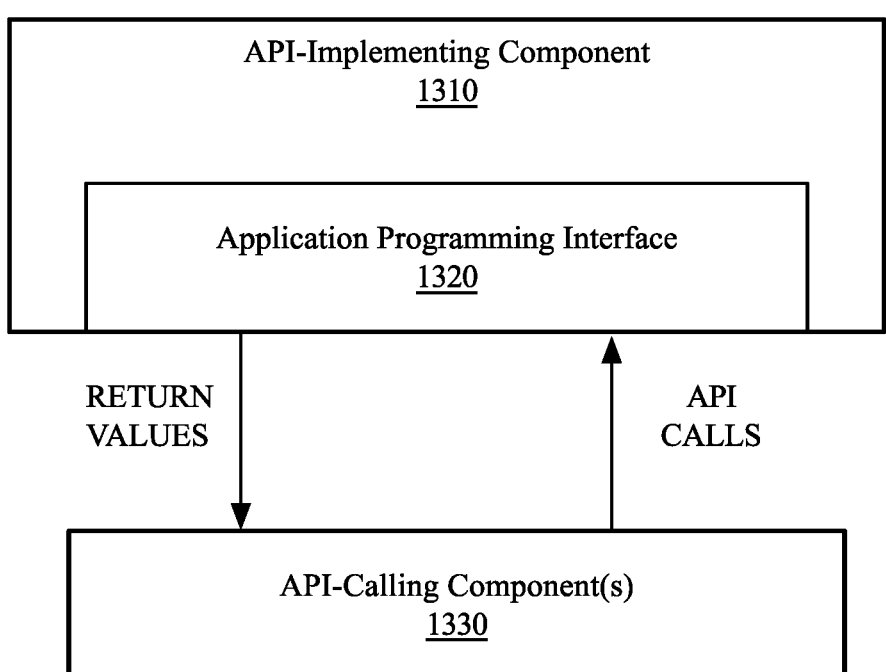
*FIG. 13*

CAPTURING LOCATION DATA FOR WAYPOINT

RELATED APPLICATIONS

This application claims the benefit of priority of U.S. Provisional Application No. 63/374,725, entitled "Capturing Location Data for Waypoint," filed Sep. 6, 2022, and U.S. Provisional Application No. 63/339,879, entitled "Capturing Location Data for Waypoint," filed May 9, 2022, each of which are herein incorporated by reference.

FIELD

Embodiments described herein relate to provision of location services.

BACKGROUND INFORMATION

Current approaches to providing device applications with accurate positioning information require continuous requests for positioning information (e.g., 1 Hz or every 1 second) by the device. Continuous requests for positioning information drain the device battery when performed for an extended period of time without an ability to recharge the battery of the device. As such, there is a need to provide location services with positioning and bearing information while preserving the life of the device battery.

SUMMARY

Embodiments described herein provide for a system, a non-transitory machine-readable medium, and methods to provide location services. In an embodiment, a method provides receiving a request to display at least one waypoint user interface object on an electronic device user interface, sending a request to duty cycle waypoint information requests for the at least one waypoint user interface object, wherein the duty cycle has a first time period based on a motion classification, and where a waypoint information request comprises at least one of a positioning request or a bearing request, upon expiration of the first time period, performing at least one of determining not to wake an application processor based on receipt of waypoint information from another application during the time period, or coalescing the waypoint information request with other process requests, and receiving the waypoint information and displaying the received waypoint information on the electronic device user interface.

In some embodiments, the method provides receiving an indication that the electronic device is a threshold distance from a position associated with the waypoint, and sending a request to duty cycle the waypoint information requests at a time interval, wherein the time interval is shorter than the first time period. In some embodiments, the method provides waking the application processor to send the at least one of the positioning request or the bearing request. In some embodiments, the method provides receiving an indication that the electronic device is settled, sending a request to duty cycle the waypoint information requests for a second time period, and requesting waypoint information from another application during the second time period. In some embodiments, the method provides the motion classification for the electronic device is in transit. In some embodiments, the method provides receiving request for a targeted view of the waypoint, and sending a request to duty cycle the waypoint information requests for a second time period, wherein the second time period is shorter than the first time period.

In an embodiment, the method provides receiving an indication of intention to interact with a waypoint complication representing a waypoint position on an electronic device, activating the waypoint complication by displaying the waypoint information with an update to a complication view, sending a request to duty cycle waypoint information requests for the at least one waypoint, wherein the duty cycle has the first time period based on the motion classification and a distance from a waypoint position associated with the complication, and receiving and displaying the waypoint information in the complication.

In some embodiments, the method provides activating the waypoint complication includes executing a navigation application to provide waypoint information. In some embodiments, the method provides receiving a request for a particular waypoint for display on the electronic device display. In some embodiments, the method provides an indication of intention to interact with a waypoint complication representing the waypoint position comprises receiving a user selection of the complication. In some embodiments, the method provides that an indication of intention to interact with a waypoint complication representing the waypoint position comprises lifting the electronic device. In some embodiments, the method provides deactivating the complication at an expiration of a timer set for a threshold period of time. In some embodiments, the method provides that the threshold period of time is a bedtime time selected by a user. In some embodiments, the method provides that the motion classification for the electronic device is in transit. In some embodiments, the method provides adjusting a duty cycle period of time based on a mode of transport for the motion classification. In some embodiments, the method provides determining not to wake at least one of an application processor or a radio processor based on receipt of waypoint information from another application during the first time period. In some embodiments, the method provides coalescing the waypoint information requests with other process requests. In some embodiments, the method provides receiving an indication that the electronic device is a threshold distance from a position associated with the waypoint, and sending a request to duty cycle the waypoint information requests at a time interval, where the time interval is shorter than the first time period. In some embodiments, the method provides receiving an indication that the electronic device is settled, sending a request to duty cycle the waypoint information requests for a second time period, and requesting waypoint information from another application during the second time period.

BRIEF DESCRIPTION OF THE DRAWINGS

FIG. 3A-8 depict user interfaces for location services in accordance with an embodiment.

FIG. 10 is a flow chart illustrating an approach for capturing waypoint information according to an embodiment.

FIG. 12 is a flow chart illustrating an approach for capturing waypoint information according to an embodiment.

FIG. 13 is a block diagram illustrating an exemplary API architecture, which may be used in some embodiments of the invention.

DETAILED DESCRIPTION

Figure 1:
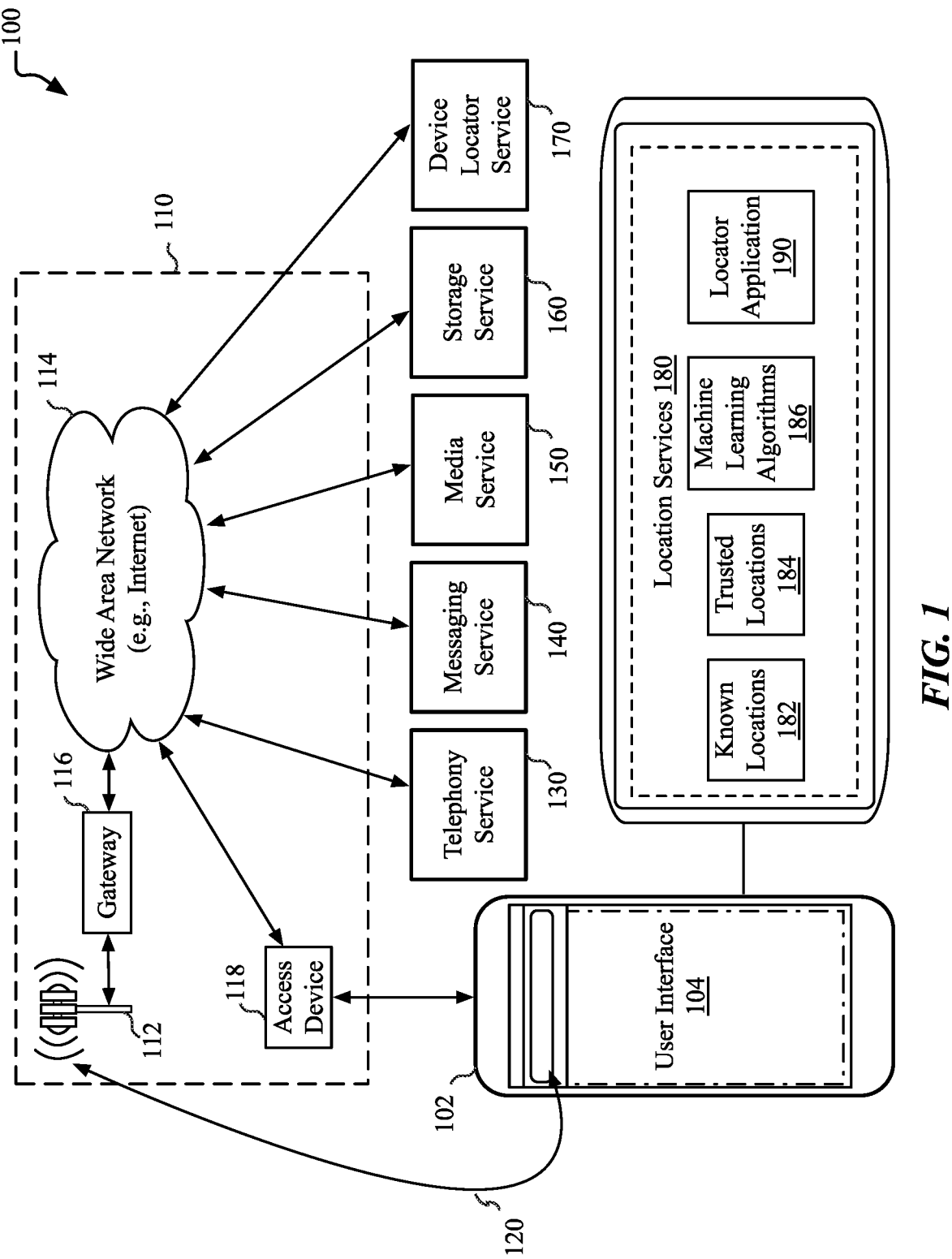
FIG. 1 is a block diagram of a network operating environment for electronic devices, according to an embodiment.

Embodiments provided herein describe power saving modes for devices capable of receiving information from a global navigation satellite system (GNSS), such as a global positioning system (GPS), to execute a location services application. In an embodiment, power saving modes are described for presentation of waypoint information in a navigation application provided by location services. A waypoint is an intermediate point or place on a route or on a path the user traveled that may be defined by a set of coordinates (e.g., latitude and longitude, a GPS point, etc.) to identify the point in physical space. The navigation application may use the coordinates of the waypoint position to track and display distance and bearing information of the waypoint position as compared to a current position of the electronic device. Bearing information provides a compass direction from an electronic device position to a waypoint position. In some embodiments, the bearing information is the horizontal angle between the waypoint position and a direction of travel of the electronic device, or the horizontal angle between the electronic device determined position and magnetic north or true north, depending on the implementation. By way of example, if the user is holding the electronic device to point and travel with the electronic device in the direction of due north and the waypoint position is directly behind where the electronic device is pointed, then the bearing would be south. Relative bearing refers to the angle between the electronic device direction of travel and the location of waypoint position.

Location services may request waypoint information including, but not limited to, positioning information and bearing information (e.g., GPS data, GPS points, etc.) repeatedly over a period of time to assist with tracking and navigation to the waypoint position. In some embodiments, the electronic device may provide directions to a waypoint position, a trajectory of travel to the waypoint position, and a distance to the waypoint position. For example, the electronic device may repeatedly request positioning information for a current position of the electronic device while the user is in transit in order to continuously calculate the distance relative to the waypoint position. In another example, bearing information may be calculated repeatedly with received positioning information.

In some embodiments, an extended power saving mode (e.g., extended mode) approach is described to extend a battery life of the electronic device (e.g., smart watch, step tracking devices, location service devices, etc.) while executing the location services application and/or collecting positioning and bearing information for the location services application during an extended period of time when a user may not be able to recharge their device. The battery life is a length of time that the device can continue to execute instructions before the device battery needs to be recharged. For example, a location services application that receives a request to record locations of the electronic device for a user on a hike, a run, participating in a marathon, on a camping trip, and/or any other activity may need to record positioning information using GNSS over an extended period of time without access to a method for recharging the battery and may need to alter functionality of the device to extend the life of the battery. In another example, positioning and bearing information may be collected to be able to provide location information if the user is lost or in an emergency situation and requires location information be accessible for the user and/or a provider of aid to the user after the extended period of time that the user is unable to recharge the device. In a non-extended mode, positioning information is obtained continuously at defined intervals of time (e.g., every second, etc.). The non-extended mode may be used sparingly in some embodiments to avoid draining the battery with continual requests made over a period of time.

In an embodiment, an extended mode provides duty cycling GNSS positioning requests for waypoint positioning and bearing information is performed to save power. Duty cycling is the fraction of a defined period of time in which a system is active. In extended mode, collection of positioning information may be requested every N minute period with intermittently received position fixes. Intermittently received position fixes may be requested and received at any time within the period such that the position fixes are received at irregular intervals of time. For example, the intermittently received position fixes are received at varying times within the N minute period and/or the position fixes are continuously requested and received for varying durations of time during the duty cycling period. The intermittent receipt of position fixes allows the application processor (AP) and/or a radio processor (e.g., GPS processor) to sleep in between requests and/or to handle requests by other applications. In some embodiments, the intermittent receipt of position fixes allows the electronic device to use a low power processor to handle requests instead of the AP, such as an always on processor (AOP) or the radio processor. Some embodiments may turn off all other functionality of the device in extended mode to allow for collection of positioning information, health information, location services applications, and/or any other limited set of applications.

In some embodiments, user context is a set of conditions that when met determine which mode (e.g., extended mode, non-extended mode), corresponding positioning techniques, and resources of the electronic device are used to obtain positioning and bearing information. User data may be analyzed to determine if the user context exists to trigger a change in a corresponding mode for determining positioning information executing on the electronic device. Alternatively, extended mode may be explicitly selected by the user via a user interface of the device.

FIG. 1 is a block diagram of a network operating environment 100 for electronic devices, according to an embodiment. The network operating environment 100 includes electronic devices 102, such as a mobile device. Mobile devices can be any electronic device 102 capable of communicating over a wireless network and/or a wireless accessory device. Some examples of mobile devices include, but are not limited to, the following: a smartphone, a tablet computer, a notebook computer, a wearable device (e.g., smartwatch or other wearable computing accessory), a mobile media player, a personal digital assistant, AirPods®, EarPods®, PowerBeats®, AirTag®, locator tags, headphones, head mounted display, health equipment, speakers, and other similar devices. In an embodiment, an accessory device may be paired with electronic device 102. By way of example, accessory devices may be devices such as Apple AirPods®, EarPods®, PowerBeats®, exercise equipment, vehicles, bicycles, scooters, smart televisions, HomePod®, HomePod Mini®, automated assistant devices, home security systems, and/or any other mobile accessory device.

Each of electronic devices 102 optionally can include a user interface, such as user interface 104 of electronic device 102. In other embodiments, an electronic device 102, may not have a user interface. Electronic devices 102 may be a third-party device that utilizes an application programming interface to access device locator services. The third-party device may be provided by a different device manufacturer or be part of a different ecosystem (e.g., operating system) from electronic device 102. Electronic device 102 can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, electronic device 102 can place and receive phone calls (e.g., using VoIP protocols), send and receive e-mail messages (e.g., using POP3 protocol), and retrieve electronic documents and/or streams, such as web pages, photographs, and videos, over the wireless network 112 (as shown with 120), gateway 116, and wide area network 114 (e.g., using TCP/IP or UDP protocols). In some implementations, electronic device 102 can place and receive phone calls, send and receive e-mail messages, and retrieve electronic documents over the access device 118 and the wide area network 114. In some implementations, electronic device 102 can be physically connected to the access device 118 using one or more cables, for example, where the access device 118 is a personal computer. In this configuration, electronic device 102 can be referred to as a "tethered" device. In one embodiment, electronic device 102 can communicate with accessory devices via a wireless peer-to-peer connection. The wireless peer-to-peer connection (not shown) can be used to synchronize data between the devices.

Electronic device 102 can communicate with one or more services, such as a telephony service 130, a messaging service 140, a media service 150, a storage service 160, and a device locator service 170 over the one or more wired and/or wireless networks 110. For example, the telephony service 130 can enable telephonic communication between electronic devices or between a electronic device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to electronic device 102 to store documents and media files. The device locator service 170 can enable a user to locate a lost or misplaced device that was, at least at some point, connected to the one or more wired and/or wireless networks 110. Other services can also be provided, including a software update service to update operating system software or client software on the electronic devices. In one embodiment, the messaging service 140, media service 150, storage service 160, and device locator service 170 can each be associated with a cloud service provider, where the various services are facilitated via a cloud services account associated with the electronic devices 102.

Electronic device 102 may have applications, services, application programming interfaces, and functionality locally accessible on the devices including and/or utilizing location services 180. Electronic devices 102 may offer one or more device locator applications 190 (e.g., a "Find my" application, a "Compass" application, a mapping application, etc.) to utilize device locator services 170 and location services 180 to locate accessory devices, provide a mapping application, and a navigation application. The navigation application (e.g., a "Compass" application) to aid the user in navigating and backtracking to historical positions on their route. The navigation application is an application that shows the cardinal directions used for navigation and geographic orientation using any number of methods including gyroscopes, magnetometers and/or positioning systems (e.g., GPS receivers). The mapping application is an application that uses maps delivered by a geographic information system (GIS). The backtrack route may be the set of historical positions obtained over a window of time that allows the user to retrace their steps.

Locally accessible data may be stored on defined locations, such as known locations 182 and safe, trusted locations 184. Machine learning algorithms 186 may be used to classify locations, infer relationships between a user and locations, provide path reconstruction and/or distance estimates in embodiments. In some embodiments, machine learning algorithms 186 may be used to provide an estimate for a distance with a set of features, including, but not limited to, intermittently received position fixes for a path and a straightness metric for a set of position fixes.

In some instances, machine learning algorithms 186 may be used to identify known locations 182, and/or trusted locations 184. By way of example, cluster data analysis may be used to identify, classify, and provide semantic labels for locations, such as locations frequented by a user. Safe, trusted locations 184 may be designated explicitly or confirmed as such by a user of the electronic device 102 after data analysis. In other instances, the known locations 182 or the trusted locations 184 may be classified offline and provided by device locator service 170 or a third-party (e.g., a database with map information). Although cluster analysis is provided as an example of machine learning algorithms that may be used, those with skill in the art will recognize that other algorithms may be used to identify potential known or trusted locations.

On-device heuristics and/or machine learning models may be used to infer relationships between a user and locations based on analysis of the locally stored data on frequented locations including frequently visited locations by the user, known locations, and/or any other locations. For example, a frequently visited location such as a home, a vehicle, a workplace, any location frequented by a user with electronic device (e.g., accessory devices, and electronic device 102) and/or any other location designated as a trusted location 184 by the user. Known locations 182 may be business locations, public spaces, parks, museums, and/or any other location that may be frequented by a user.

Defined locations may have associated fence information that provides a set of conditions, if detected, allow for designating or classifying an electronic device relative to a region of physical space for at least a portion of the defined location. For example, fence information may provide the conditions for classifying the electronic device as either inside or outside a region of physical space associated with the defined location. In another example, fence information may provide the conditions for classifying the electronic device as transitioning between inside or outside the region of the defined location. Fence information may be a geofence with boundary information for the defined location, such as a point location and the extents of the region from the point location (e.g., a circular region defined with a radius from the point location, a polygon shape with distance measurements from the point location, etc.). Fence information may include a set of sensor measurements received by electronic devices (e.g., fingerprint data including radio frequency (RF) scan data, such as Wi-Fi scan traces, etc.) that are characteristic of a particular region of the defined location. Fence information for the respective defined locations may be stored along with classification type for the location and any semantic label assigned to the location. Boundary information may include a defined set of boundaries or a radius distance around a point location to allow for creation of a fence for the location. In some embodiments, the fence is a virtual perimeter for a real-world geographic area. Global positioning system (GPS) may be used to create a virtual fence around a location and track the physical location of the electronic device 102 within the geofence boundary as well as entry and exit of the bounded area. In some embodiments, there are at least two tiers of fences that may be used to reduce traditional geofence latency. For example, the mode selected based on analysis of user contextual data to determine intent may factor into selection of the granularity of the fence established. In some embodiments, multiple fences may be used to refine positioning information determined by a coarse-grained geofence.

Machine learning algorithms 186 may include on-device heuristics, machine learning algorithms, or a combination thereof to analyze and assign a label describing a user context, such as a location status. The location status may be a label for a user context (e.g., set of conditions, a motion classification) in which specific positioning techniques and resources of the electronic device are used to obtain positioning information. The location status may define a current location state and/or a prediction of a change in location state of a user while traveling with the electronic device. By proactively obtaining positioning information using techniques appropriate for the location status, latency is reduced in provision of the information for device applications without incurring a noticeable decline in performance of the electronic device that may be experienced with constant requests for positioning information. For example, the user context may indicate movement or travel of an electronic device to allow the electronic device to be designated as having a motion classification, such as "in transit", "settled" in a particular defined location for a time period, or any other defined motion classification. Analysis may be performed using a variety of signals from contextual user data sources available to the electronic device 102, including, but not limited to, the following: sensor data, positioning data, calendar data, transit card usage data, application data, historical data on patterns/routines of travel, wireless connection status with accessory devices and/or services (e.g., Bluetooth connection status), device location history, and/or any other data accessible to the electronic device 102. In an embodiment, the wireless connection status with various devices may indicate that the device is settled or "in transit."

For example, a loss of a connection to an appliance, a security system, a heating/cooling systems, vehicles, other modes of transport, and/or any other devices may indicate that the electronic device is "in transit".

In some embodiments, a electronic device 102 may be classified with a "settled" semantic label after remaining within the geographic boundaries that define a location (e.g., the trusted location 184) for a defined time period. In an example, received positioning data for the electronic device 102 may indicate the electronic device 102 remained within the boundaries of a fence for a particular location for a duration of time (e.g., 5 minutes). Sensor data, such as accelerometer data, may indicate that the electronic device 102 is at rest to support an inference of being settled. Application data may support the inference that the electronic device 102 is settled, such as the electronic device being located at a calendar appointment location. Application data indicating a type of application in use may also provide an inference of the device being settled, such as using a media application. Historical data for the user on routines or patterns in travel may be used to determine whether the electronic device 102 is settled, such as a bedtime routine at a home or a hotel location.

Electronic device 102 may be classified as having an "in transit" label based on prior detected behavior, patterns, or routines for the user, and analyzed on electronic device 102. For example, the user may have routine of going to work around the same time every day and an "in transit" state may be assigned if the data on the device supports that the pattern is being repeated. A speed at which the electronic device is moving or entering and exiting known geographic areas (e.g., using fences) may allow for the inferring that the electronic device 102 is in transit. If the electronic device 102 is detected as accelerating in known areas of transit (e.g., on roads, highways, train routes, etc.), then the electronic device 102 may be given the motion classification of "in transit." Similarly, if transit applications/cards are used/in use, then the electronic device 102 may be designated as "in transit".

Electronic device 102 may be classified as a "threshold distance," "near an entry," "near an exit," "entry" and/or "exit" of a set of locations or a particular location based on crossing fence boundaries for the respective location or set of locations and/or detecting a pattern of sensor values that are characteristic of being in a location, such as Wi-Fi scan results characteristic of being inside a location or transitioning into a location.

Figure 2:
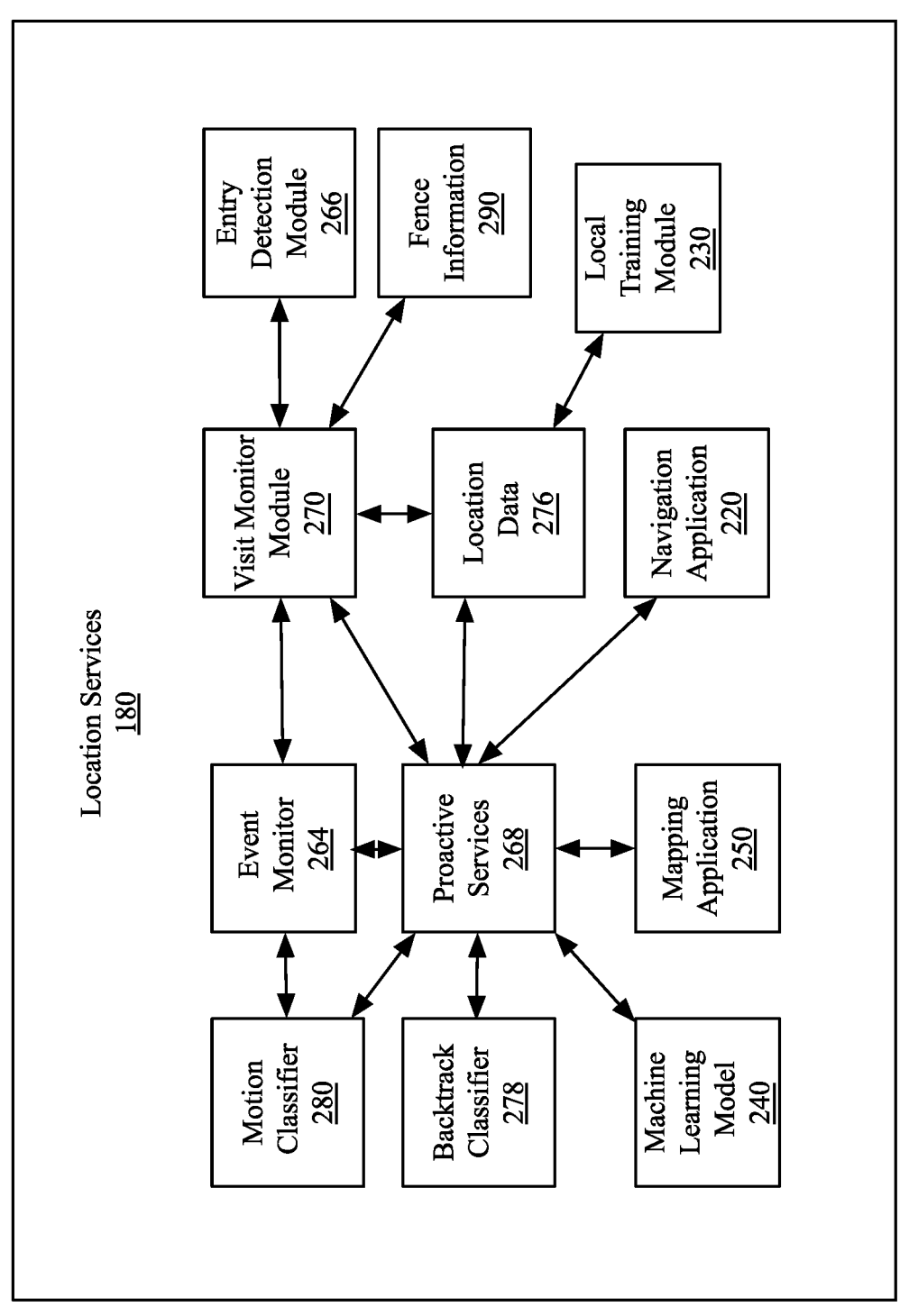
FIG. 2 is a block diagram for location services according to an embodiment.

FIG. 2 is a block diagram for location services according to an embodiment. Location services 180 may include an event monitor module 264 (e.g., a fence event monitor, location status monitor, sensor monitor, etc.) that may aid in determining when power and performance modes should be adjusted for determining positioning and/or bearing information. Event monitor module 264 may rely on data from contextual user data sources to serve as cues for user context and event monitor module 264 may use heuristics and/or machine learning algorithms 186 to determine user contexts that trigger adjustment of modes. In some embodiments, user context and a location state may determine adjustments to power and performance modes executed on the electronic device 102. The location state of the user of is either in a defined location or traveling between locations. By taking into consideration the location state of the user and user context (e.g., information from motion sensors, application data), positioning and/or bearing information may be provided in anticipation of the user needing the information.

In some embodiments, the events monitor module 264 may use data to determine adjustments to modes that may impact power or performance for the operation of the electronic device 102. For example, the user context of the electronic device 102 may include a designation of "in transit" using a motion classifier 280 and wireless connection status data that a Bluetooth connection is lost between the electronic device 102 and an accessory device, such as a vehicle entertainment system. Continuing with the example, the events monitor module 264 may determine from one or more contextual user data sources (e.g., motion classifier, wireless connection status) that there is at least one indication that there will be a change in location status and/or motion classification of the electronic device 102, such as the electronic device 102 may be "in transit to a defined location" because the user is "in transit" and lost the Bluetooth connection to the vehicle entertainment system, so the user may have exited the vehicle and is in transit to a location. Crossing fence boundaries for one or more defined locations may indicate that the user intends to enter a defined location. User contextual data, such as crossing fence boundaries, exiting a vehicle, exiting a transit station, user routines, sensor data, application data, etc., may be analyzed to predict that the electronic device is a threshold distance from a defined location and that the mode for electronic device should be adjusted.

In an embodiment, events monitor module 264 may detect from user contextual data that the user is in a remote location (e.g., wilderness), on an unfamiliar route, and/or unlikely to charge their device for an extended period of time. For example, a variety of signals from user contextual data may indicate that the user will be unlikely to charge their device, such as application data indicating a user tracking a workout, a maps application with a hiking path selected for display, a loss of cellular service, and/or any other data accessible on the device that provides context for activities of a user. In another example, the user may select a mode that indicates the user will not be able to recharge the electronic device 102.

The visit monitor module 270 may utilize event monitor 264, fence information 290, and entry detection module 266 to accurately detect entry to a defined location and reduce latency for provision of positioning information by predicting the user will request the positioning data. The visit monitor module 270 may retrieve fence information 290 to define a more precise boundary for a defined location when the electronic device 102 is detected crossing a more coarse-grained geofence boundary, as detected using the entry detection module 266. In another embodiment, the visit monitor module 270 may retrieve expected sensor data (e.g., fingerprint data) characteristic of an electronic device 102 with the location status.

The proactive services 268 may be used to predict what applications and/or services that the user may want to access with a given user context, motion classification, and/or location status. For example, the user may want to access a particular application just prior to or upon entry to a location. Proactive services 268 may select applications based on user history of application selection or suggest a new application associated with a particular defined location.

In an embodiment, the electronic device 102 (with the event monitor 264) may detect a set of conditions that allow for an inference that user may request a backtrack route to allow for retracing their steps and the electronic device 102 may initiate an extended power saving mode to obtain the positioning information so as not to affect the performance of the electronic device 102. In an embodiment, proactive service 268 may adjust a rate for periodic requests for determining positioning information. To handle intermittent receipt of positioning information, a machine learning model 240 may be used to reconstruct a path from user accessible data and estimate a distance for the path taken by the user.

In some embodiments, map data accessed by a mapping application 250 is used to estimate distances. The mapping application is an application that uses maps delivered by a geographic information system (GIS). The navigation application 220 may provide heading or direction (e.g., degrees from magnetic north) information for the electronic device 102 that is collected as the user is traveling, and the heading data is averaged to eliminate errors in heading information collected due to variations in heading measurements collected due to movement of the device (e.g., jostling of device, swinging of hand if device worn on wrist of user, etc.) as the user travels along their trajectory.

Proactive services 268 and event monitor 264 may use a motion classifier 280 and a backtrack classifier 278. A motion classifier 280 that has been trained on a feature set from data obtained using electronic device sensors may provide information on whether electronic device 102 is stationary or in transit with a user. While embodiments are not limited to a specific sensor type, specific sensor data representations, or specific features, exemplary sensors, and features are described herein that are capable of distinguishing between specific movements within the sensor data. The motion classifier can analyze provided features from sensor data using one or more models that are trained to perform identification of motion type based on the supplied features. In some implementations, the electronic device can receive motion classification from the electronic device or from a server indicating that the electronic device is traveling in a particular mode of transport. The backtrack classifier classifies obtained historical positions for the electronic device 102 as potentially part of a backtrack route for a user of the electronic device In some embodiments, the electronic device 102 in FIGS. 3A-15 is a mobile device as described with FIGS. 1-2.

Figures 3A, 3B:
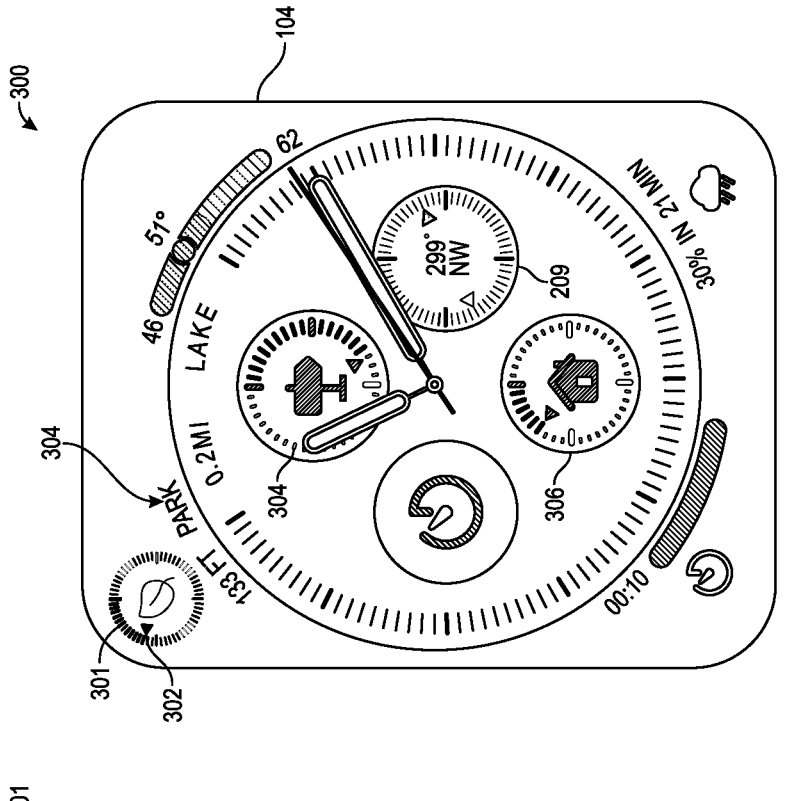

FIG. 3A depicts a user interface 201 for location services in accordance with an embodiment. The user interface 104 depicted is a smart watch face with location services complications 203, 205, 207, and 209. A "complication" is an object on a watch face that represents and displays information for an application and does not tell time, such as a date, weather information, atmospheric pressure, calendar information, a navigation application 220, a waypoint, etc. A particular complication corresponds to a particular application (e.g., navigation application) that may be executed on the device displaying the watch face. The complication can be displayed within a particular "style window" of a watch face. A "style window" can correspond to a part of a watch face that is designated to display the complication. In some embodiments, a user can configure a watch face by determining which information (e.g., by selecting a watch application) is to be displayed in a particular style window. As used here, the term "affordance" refers to a user-interactive graphical user interface object that can optionally be displayed on the display screen of electronic device 102. For example, an image (e.g., icon), a button, and text (e.g., hyperlink) can optionally each constitute an affordance.

The complications 203, 205, and 207, as illustrated, are deactivated and the corresponding application (e.g., navigation application 220 with waypoints) is not servicing requests for the deactivated complications on the electronic device 102. As illustrated, the deactivated complications 203, 205, and 207 may be greyed out with a particular shading to indicate that the navigation application 220 is not servicing requests for the complication. The complications 203, 205, and 207 represent navigation applications 220, and upon selection of the affordance corresponding to the respective complication, the bearing information is provided for a user selected waypoint position. For a dynamic waypoint complication, the user may be presented with a dialog (e.g., user interface) to select a waypoint position for the complication to be displayed on the watch face upon activation. For a static complication, the waypoint position may have already been assigned for the complication or the complication is predefined, and the navigation application 220 may provide bearing information for the respective waypoint. By way of example, a predefined or default complication may be for a car position and/or a home location. In another example, a user may select waypoints for a campsite and/or a park that may have been defined when the user was hiking and the user may want to select the waypoints to find their way back. In another example, complication 209 is activated and displays bearing information from true north for the electronic device 102 using the navigation application 220.

In some embodiments, the complications can be activated by interacting with the affordance representing the complication. For example, if the user selects the affordance representing complication 203 for the "Park" waypoint FIG. 3A, then the navigation application 220 services requests for the waypoint information (e.g., direction to the "Park" waypoint 302 and distance to waypoint 304 in the activated complication 301) and the information is displayed in activated complication 301 in FIG. 3B corresponding to deactivated complication 203 in FIG. 3A.

FIG. 3B depicts a user interface 300 for location services in accordance with an embodiment. The user interface 104 depicts activated complications: 301 (corresponding to deactivated 203 in FIG. 3A), 304 (corresponding to deactivated 205 in FIG. 3A), 209, and 306 (corresponding to 207 in FIG. 3A). In some embodiments, icons (as shown with a leaf icon 301, a house icon 306, a leaf icon 301, and a sign icon 304 in activated complications) for waypoints are predefined (e.g., a car icon for a parked car, a house icon for a user's home or a campsite 306, a leaf icon for a park location 301, etc.) or assigned by the user (e.g., a sign with a particular color 304).

As shown in complication 301, the navigation application 220 provides the bearing information by displaying marker 302 within the complication to represent how far to the right the waypoint position is for the "Park" waypoint 301 from the user's current position. After the complications are activated, the complications may be updated with information for requests at a first time period (e.g., every 15 minutes), but the frequency may decrease or increase based on the motion classification and/or mode of transport. For example, complications 304, 209, and 306 may be serviced by duty cycled requests operating at a first time period (e.g., every 15 minutes), and complication 301 may be serviced with requests that occur at a first time interval value (e.g., every 1 second) because the user is moving toward the waypoint. In some embodiments, if the user selects affordance (e.g., with a long press on the screen) complication 301, the user interface for a targeted view of the waypoint may be provided, as shown in FIG. 4.

Figures 4, 5:
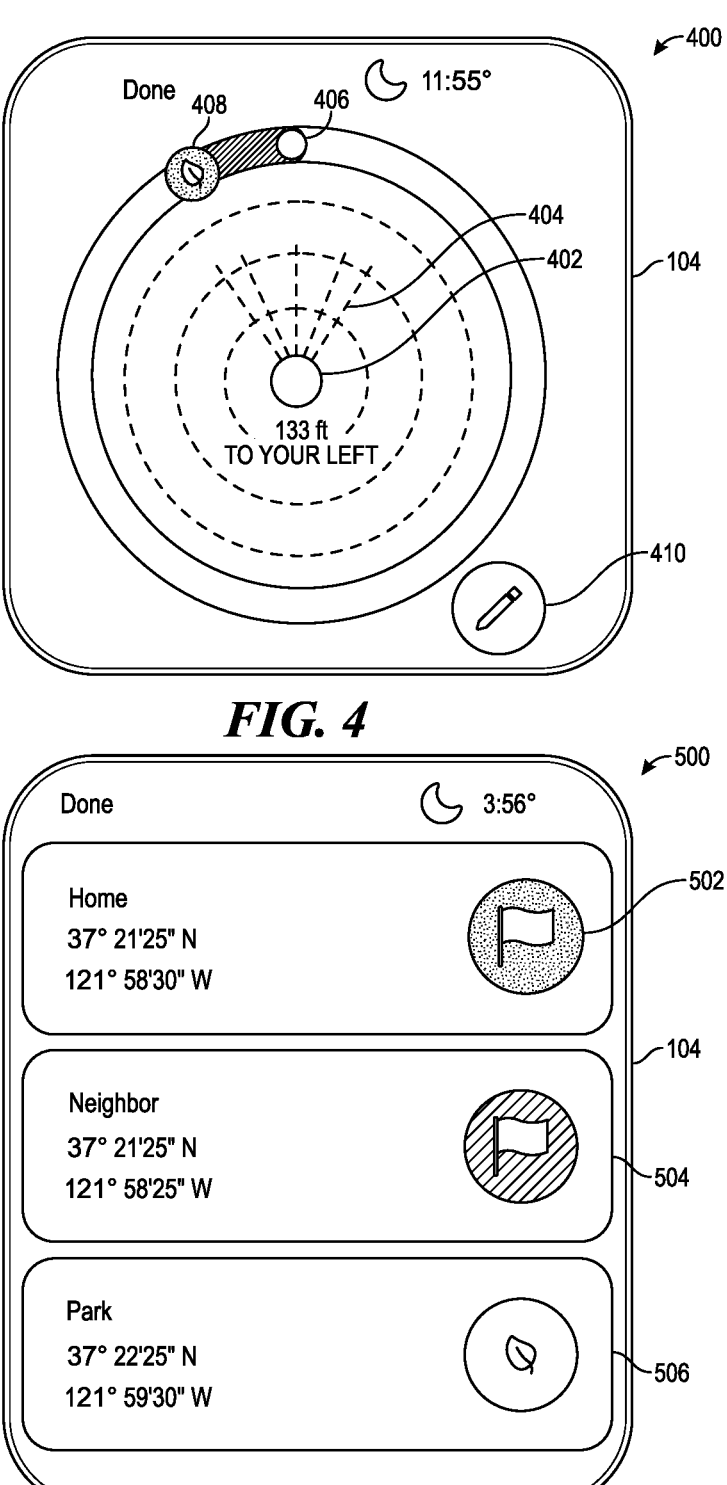

FIG. 4 depicts a user interface 400 for location services in accordance with an embodiment. As illustrated a targeted view for "Park" waypoint after depression of the affordance representing complication 301, is shown in user interface 104. The "Park" waypoint position 408 is 133 feet to the left of electronic device 102 current position 406 in relation to the "Park" waypoint position 408. In an embodiment, the waypoint information may be requested with an increased frequency (e.g., every second). Affordance 410 may be selected to allow the user to edit and/or select other waypoints for the targeted view 400 as shown in FIG. 5. The highlighted portion 404 (illustrated with dotted lines) represents the direction that the user is facing from their position 402.

FIG. 5 depicts a user interface 500 for location services in accordance with an embodiment. Waypoint positions 502, 504, and 506 may be edited and/or selected for display in targeted view 400 and/or selected for complications on the electronic device 102. For example, "Park" 506 may be selected within the user interface 500 to display the targeted view 400 for the "Park" waypoint position 408. Each of the waypoint positions 502, 504, and 506 may be selected to be edited.

Figure 6:
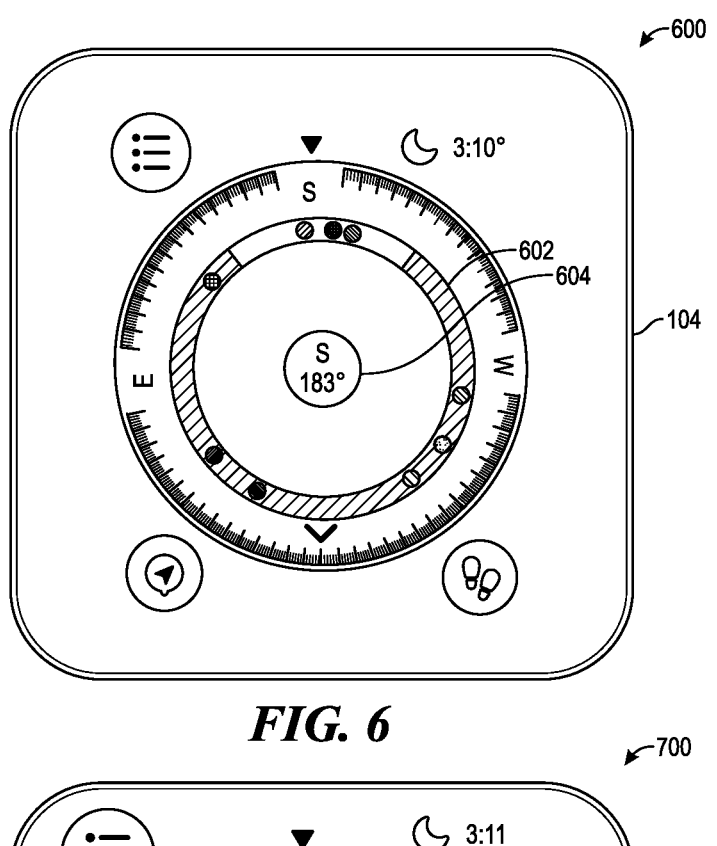

FIG. 6 depicts a user interface 600 for location services in accordance with an embodiment. In another embodiment, a navigation application 220 may be a "Compass" application that allows the user to view defined waypoints relative to their current location 604. Waypoint positions are displayed in a ring 602 relative to a user's position 604 in user interface 104 of a navigation application 220 in an embodiment. The three waypoints in the non-shaded portion of ring 602 represent the waypoints in the direction that the user is facing. Duty cycling at varying time periods is performed for waypoint information requests to depict the relative location of the waypoints from the electronic device 102 current position repeatedly as the user is in transit. In an embodiment, the waypoint information for the waypoints represented in 602 may be obtained at a decreased frequency because the user has zoomed in to the user's current position 604 and the waypoint positions relative to the mobile device 102 position 604 (e.g., user's position) does not require the level of detail for positioning and bearing information as compared to FIG. 7 view.

Figure 7:
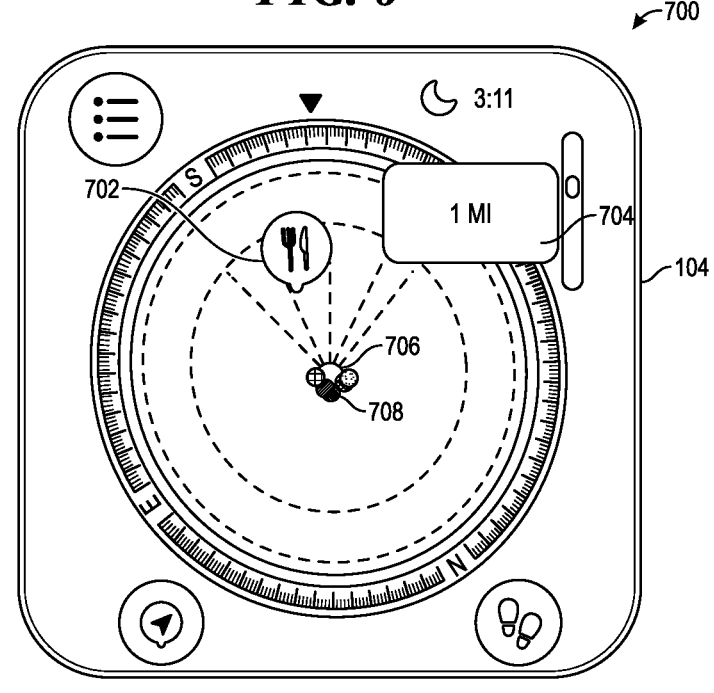

FIG. 7 depicts a user interface 700 for location services in accordance with an embodiment. Waypoint positions 702 and grouped at 708 are displayed relative to a mobile device 102 (e.g., a user's position) 706 in user interface 104 of a navigation application 220. The distance is provided in user interface element 704 to waypoint position 702. As illustrated, the user's position 706 is closer in proximity to the waypoint positions 702 and the frequency of bearing and positioning information requests may be increased to provide accurate details for the bearing and position relative to the user within the user interface 104.

Figure 8:
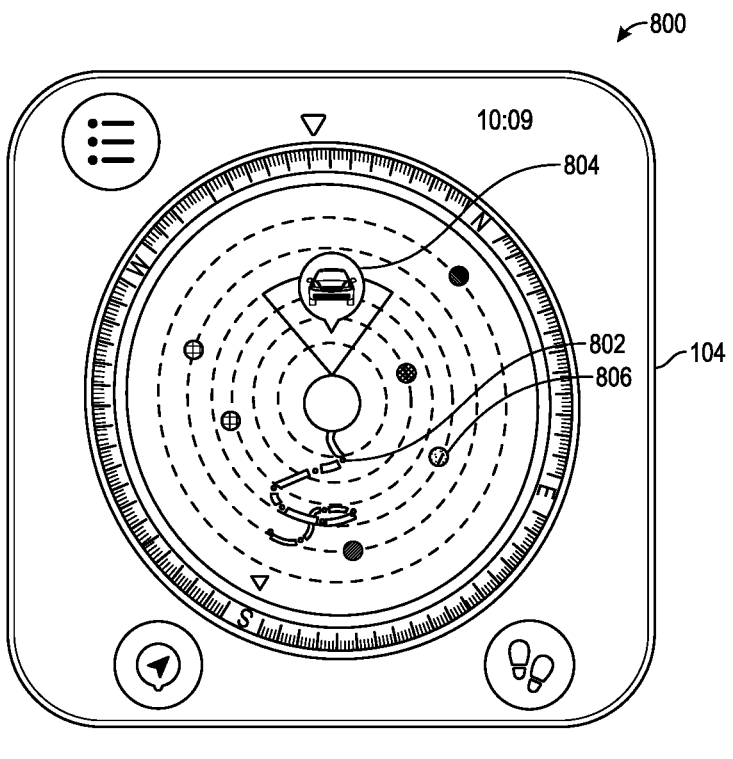

FIG. 8 depicts a user interface 800 for location services in accordance with an embodiment. A navigation application 220 is depicted with an icon representing the location of a user's vehicle with waypoint 804, various waypoints (e.g., 806) and a path 802 that a user has taken. The waypoint 806 and user vehicle 804 position may mark a place of special interest to the user and are depicted with an icon or marker as a relative position to a user's current location. If the user is on a backtrack path 802, then the waypoint information may be obtained with an increased frequency.

Capturing Waypoint Information

Figure 9:
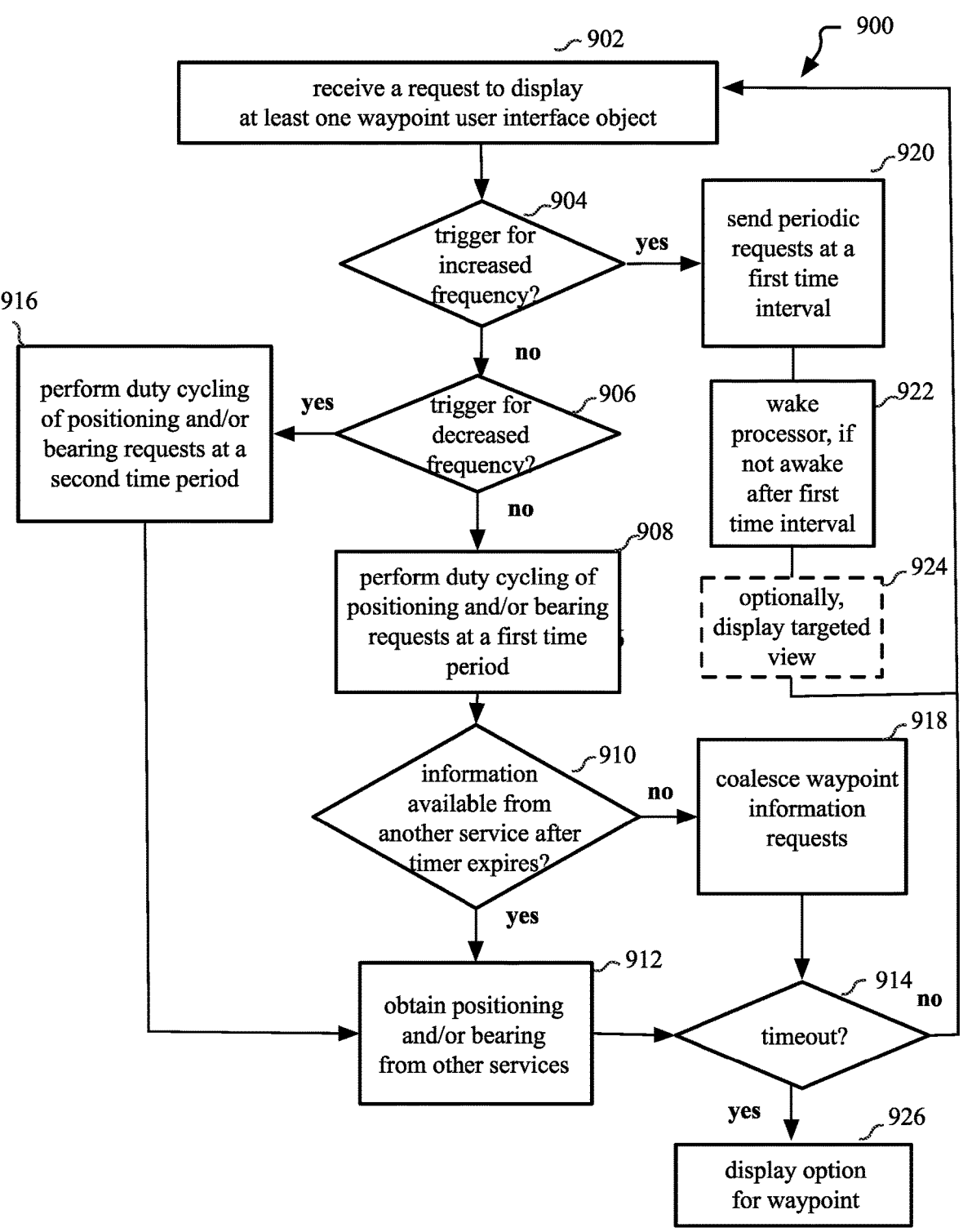
FIG. 9 is a flow chart illustrating an approach for capturing waypoint information according to an embodiment.

FIG. 9 is a flow chart 900 illustrating an approach for capturing waypoint information according to an embodiment. The flow chart 900 illustrates an approach for providing waypoint information (e.g., including positioning and bearing information for waypoints) relative to a position of the user with the electronic device 102 using the extended power savings mode. The flow chart 900 is a model for providing waypoint information in a power conserving way particularly when the user may not be able to easily recharge their electronic device 102 battery for an extended period of time.

As described herein, requests that are duty cycled for provision of waypoint information may be construed broadly to include positioning requests that are used to retrieve the underlying data for calculating waypoint information (e.g., GNSS requests). In other embodiments, requests that are duty cycled for provision of waypoint information include bearing data requests for underlying data and/or the calculation of the waypoint information itself (e.g., calculations for bearing). Those with skill in the art will recognize that waypoint information requests that are duty cycled may include any type of request for the provision of waypoint information for location services applications that preserves the life of the battery by duty cycling of the requests. In an embodiment, positioning requests to provide the underlying data for calculating waypoint information displayed on user interfaces 104 are duty cycled.

In the extended power savings mode, collection of waypoint information may be requested every N minute period (e.g., first and second time periods described herein) with intermittently received information. Duty cycling of positioning and/or bearing data requests is increased to be requested at a consistent time interval value (e.g., in a non-extended mode) when more frequent requests are needed for provision of more precise and/or detailed information. Duty cycling of requests may be increased and/or decreased as needed to preserve the battery with provision of waypoint information at varying time periods depending on the user context in some embodiments. Examples of embodiments that use the model described herein with the display of waypoint information are illustrated in FIG. 4, FIG. 6, FIG. 7, and FIG. 8.

Electronic device 102 receives a request to display at least one waypoint user interface object (902). For example, the request to display at least one waypoint user interface object may be a selection via the user interface 104 to open and/or execute a navigation application 220 and the navigation application 220 may include one or more user interface objects representing waypoint positions to display on the user interface 104 (e.g., user interfaces FIG. 6, FIG. 7, and FIG. 8). In another example, the request to display at least one waypoint user interface object may be a user selection via the user interface 104 to display a targeted view of a particular waypoint position(s) (e.g., user interfaces FIG. 4 a targeted view, FIG. 8 with a targeted view and multiple waypoints displayed, etc.).

User context may be analyzed to determine triggers for requesting waypoint information at an increased frequency (e.g., in a non-extended mode) (904). A variety of data sources may be analyzed to determine user context, including, but not limited to, the following: sensor data, application data, known user routines, known locations of interest, detection of entry and/or exit of a vehicle (e.g., loss of Bluetooth connection to vehicle), and/or any other user data. In an embodiment, the electronic device 102 selects a mode (e.g., extended or non-extended mode, etc.) based on conditions met in user contextual data, such as time or events, that indicate time interval values for capturing waypoint information. For example, if a user context includes the conditions of being in transit for a long period of time and/or limited cell service (e.g., weak, intermittent access, etc.), then such conditions potentially indicate a user is on a hike and waypoint information may proactively be captured at an increased frequency to allow a user to retrace their steps. In another example, user context of use of a mapping application to view a hiking trail and/or a remote location may be a condition that indicates the user is on a hike and positioning data is requested at an increased frequency with a time interval value of every 1 second to provide the waypoint information.

In an embodiment, one or more conditions for determining a mode and/or a time period for duty cycling of requests for provision of waypoint information include, but are not limited to, the following: in transit (e.g., not stationary) motion classification, proximity to a waypoint position, mode of transport, threshold period of time without network access, sparse (e.g., not densely populated or density of manmade structures in the area, etc.) environment classification, threshold distance from a frequented location and/or location that is part of a user routine, and/or any other relevant user contextual data. While specific categories of conditions are provided, those with skill in the art will recognize that any other user contextual data may supplement and/or form the basis of an inference that the user will request historical positioning information for backtracking.

If the electronic device 102 receives a trigger for increasing frequency of duty cycling for provision of data for waypoint information requests (904), then the positioning and/or bearing data requests are sent continuously at a first time interval (e.g., 1 Hz or every 1 second) (920). In an embodiment, the triggers for increasing frequency of duty cycling include conditions when the user needs precise, detailed information without delay, including, but not limited to, the following: emergency situations, backtracking to a waypoint position, a particular threshold distance value from a waypoint position (e.g., a first waypoint threshold distance indicating a need to increase frequency), and/or based on mode of transport where the user is traveling at a constant speed such the user rapidly approaches a waypoint position (e.g., biking, running, not automotive vehicle, etc.). For example, a first waypoint threshold distance value for increasing a frequency of requests may be defined to represent a distance from the waypoint position such that when the user moves to be within the first waypoint threshold distance value from the waypoint position, the frequency of requests is increased. By way of further example, when the user is traveling at a constant speed, the user may need frequent, detailed, and/or precise updates because the distance and/or bearing values may be changing at a rapid rate and the first waypoint threshold distance value may be set at a distance value (e.g., 100 feet) so that the frequency of requests is increased when the user is within 100 feet of the waypoint position to provide the information.

After the use of a first time interval for requests is determined (920), the electronic device 102 wakes the AP and/or the radio processor after expiration of the first time interval value (e.g., 1 second) (922). Optionally, the electronic device 102 may display a targeted view for navigation to the waypoint position as shown in FIG. 4 (924). The process for obtaining waypoint information continues with (902) as described herein. In some embodiments, the power savings mode changes may be a de-escalation from higher power state with more precise location monitoring (e.g., non-extended mode) to a low power state with coarse location monitoring (e.g., extended mode) to extend the life of the battery.

Continuing with FIG. 9, alternatively, if there is no trigger for increased frequency of waypoint information requests (904), then the electronic device 102 determines which time period to use for duty cycling of waypoint information requests in an extended mode (906). Conditions that trigger a decreased frequency (906) include, but are not limited to, the following: a number of waypoint positions that are a second waypoint threshold distance value to the electronic device 102 (e.g., no waypoint positions, waypoint positions that exceed a second waypoint threshold distance value from the electronic device 102 such that a change in user position would not alter the view of the waypoint relative to the user on the user interface 104, motion classification (e.g., stationary), and/or mode of transportation (e.g., on a plane). If the conditions are met for decreasing the frequency of requests (916), then the second time period (e.g., fifteen minutes) is used for obtaining waypoint information and waypoint information is obtained from other applications and/or services (912). By way of example, if the user is on a plane, stationary, or there are no waypoint positions close enough to their current position that would be displayed with a noticeable change on the display for a time greater than the second period, then the second time period is used for duty cycling. The second time period is a greater period of time than the first time period. The process may either timeout (914) such that an option to use a waypoint is displayed on the electronic device 102 (926) or the process continues (902).

Alternatively, continuing with FIG. 9, if a decreased frequency is not triggered by the current conditions (906), then duty cycling is performed at a first period of time (908). The first time period (e.g., 2 minutes) may be a greater time period value than the first time interval for increased frequency duty cycling in non-extended mode, but less than the second time period for decreased frequency duty cycling. In some embodiments, the first time period may be a period of time that the application processor and/or radio processor of the electronic device 102 is expected to wake during ordinary operation of the electronic device 102.

The duty cycling of requests provide intermittently received information at any time within the period (e.g., the first or second time period) such that the waypoint information (e.g., bearing and positioning information) is received at irregular intervals of time. For example, the intermittently received position fixes can be received at varying times within the N minute period and/or the position fixes are continuously requested and received for varying durations of time during the duty cycling period. The intermittent receipt of position fixes allows the application processor (AP) and/or a radio processor (e.g., GPS processor) to sleep in between requests and/or to handle requests by other applications. After the timer expires for the first time period, the electronic device 102 determines if the waypoint information is available from another service and/or application (910), then uses waypoint information from another service and/or application, if available (912). The process may either timeout (914) such that an option to use a waypoint is displayed on the electronic device 102 (926) or the process continues (902).

Alternatively, if no waypoint information is available from another service and/or application (910), then the requests for provision of waypoint information (e.g., positioning requests) are coalesced with other service requests and executed on the application processor and/or radio processer when another service wakes the processor(s). The process may either timeout (914) such that an option to use a waypoint is displayed on the electronic device 102 (926) or the process continues (902).

FIG. 10 is a flow chart 1000 illustrating an approach for capturing waypoint information according to an embodiment. The electronic device 102 may receive a request to display at least one waypoint user interface object on an electronic device 102 user interface (1002). The electronic device 102 sends a request to duty cycle requests for provision of waypoint information for the at least one waypoint user interface object (1004). The duty cycle has a first time period based on a motion classification, and the requests for provision of waypoint information may include at least one of a positioning request and/or a bearing request for display on the electronic device 102 user interface 104. The motion classification and the mode of transport may determine the frequency of requests that can provide bearing and positioning information commiserate with the speed at which the user may be traveling (including stationary) and/or a threshold distance to the waypoint position. A default setting for the duty cycling period for requests may be based on testing how often the electronic device processors (e.g., application processor and/or radio processors) wake with regular use depending on the type of device (e.g., smart watch, smartphone, etc.). The duty cycling may be increased if the user exceeds a first waypoint threshold distance value for increasing a frequency of requests, during an emergency situation, and/or if traveling via a mode of transport (e.g., jogging, biking, etc.) that increasing the frequency would provide more accurate detail on bearing and positioning information, in some embodiments. Alternatively, the duty cycling may be decreased if the user with the electronic device 102 is stationary and/or traveling by plane, and/or exceeds a second waypoint threshold distance value, in some embodiments. Although specific conditions for adjusting the frequency of requests are described, those with skill in the art will recognize that any condition met that indicates a user may need less or more waypoint information requests to provide needed accuracy and detail as weighed against the impact to device resources may factor into a decision for adjusting the frequency of requests for duty cycling. The electronic device 102 sets a timer to determine when each time period has expired. Upon expiration of the first time period according to the timer (1006), the electronic device 102 determines whether or not there is information from another applications (1006). If there is information from other applications (1006), then the electronic device 102 determines not to wake an application processor based on receipt of waypoint information (e.g., bearing and/or positioning request information) from another application during the time period (1008). Alternatively, if there is no information from another application after timer expiration (1006), then the electronic device 102 coalesces the request for provision of waypoint information (e.g., positioning requests) with other process requests (1010). The electronic device 102 receives the waypoint information and displays the received waypoint information on the electronic device 102 user interface (1012).

Figure 11:
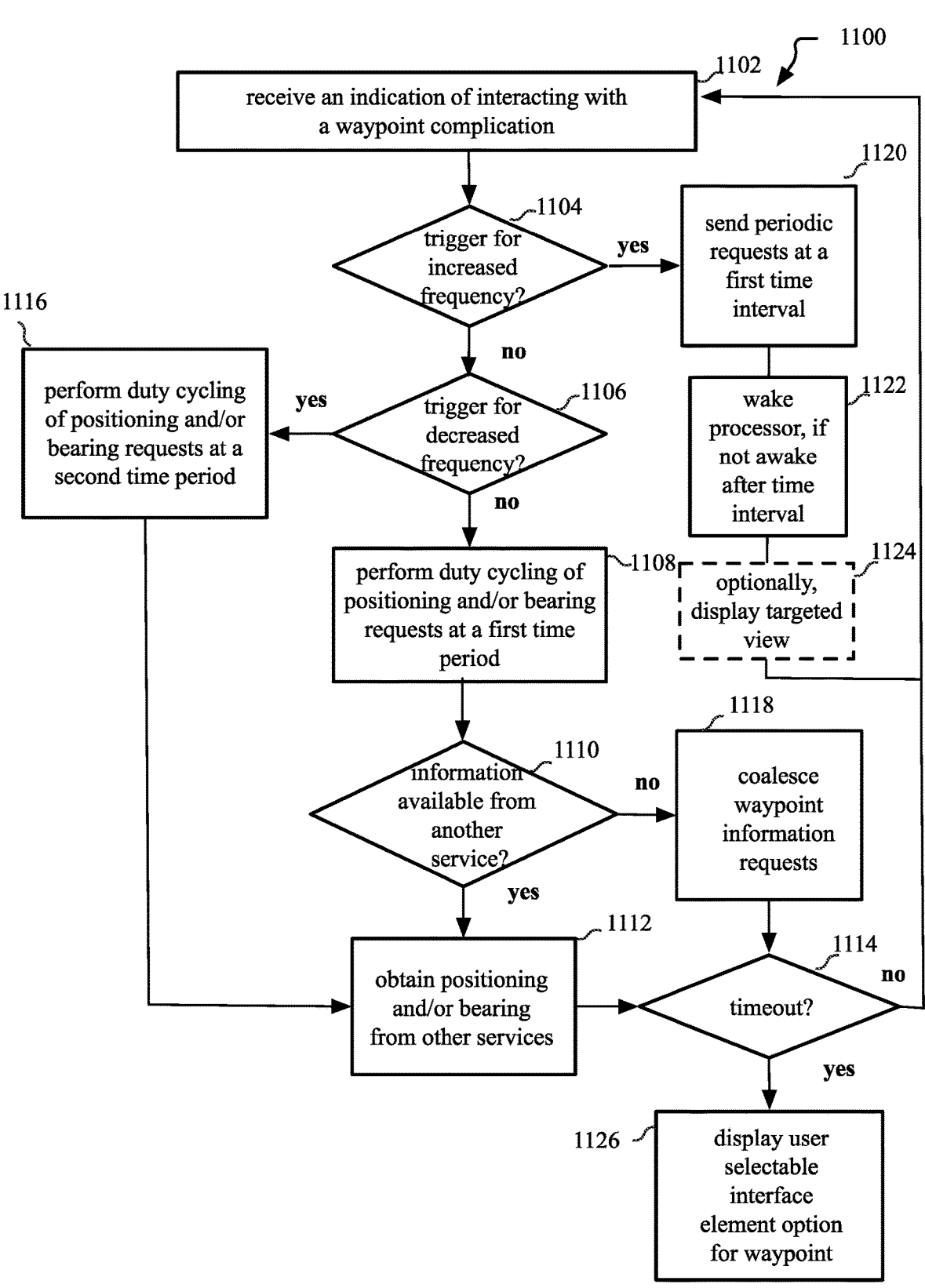
FIG. 11 is a flow chart illustrating an approach for capturing waypoint information according to an embodiment.

FIG. 11 is a flow chart 1100 illustrating an approach for capturing waypoint information according to an embodiment. The flow chart 1100 illustrates an approach for providing waypoint information (e.g., including positioning and bearing information for defined waypoints) relative to a position of the user with the electronic device 102 using the extended power savings mode. The flow chart 1100 is a model for providing the waypoint information in a power conserving way particularly when the user may not be able to easily recharge their electronic device 102 battery for an extended period of time.

As described herein, requests that are duty cycled for provision of waypoint information may be construed broadly to include positioning requests that are used to retrieve the underlying data for calculating waypoint information (e.g., GNSS requests). In other embodiments, requests that are duty cycled for provision of waypoint information include bearing data requests for underlying data and/or the calculation of the waypoint information itself (e.g., calculations for bearing). Those with skill in the art will recognize that waypoint information requests that are duty cycled may include any type of request for the provision of waypoint information for location services applications that preserves the life of the battery by duty cycling of the requests. In an embodiment, positioning requests to provide the underlying data for calculating waypoint information displayed on user interfaces 104 are duty cycled.

In the extended power savings mode, collection of waypoint information may be requested every N minute period (e.g., first and second time periods described herein) with intermittently received information. Duty cycling of positioning and/or bearing data requests is increased to a consistent time interval value (e.g., in a non-extended mode) when more frequent requests are needed for provision of more precise and/or detailed information. Duty cycling of requests may be increased and/or decreased as needed to preserve the battery with provision of waypoint information at varying time periods depending on the user context in some embodiments.

Electronic device 102 receives an indication that the user is interacting with a waypoint complication (1102). Examples of embodiments with the waypoint information for complications is provided as illustrated in FIG. 3A and FIG. 3B. An affordance for the waypoint may be selected (e.g., 205, 203, 207) to activate the waypoint complication and display waypoint information for selected waypoints and/or to open the navigation application 220 to display a targeted view associated with waypoint complications (e.g., 304, 301, 306). The indication that the user is interacting with the waypoint complication may be a selection received via the user interface 104 to open and/or execute the navigation application 220 with a request to display a targeted view of a particular waypoint position (e.g., user interfaces FIG. 4 a targeted view and FIG. 8 with a targeted view and multiple waypoints displayed). In some embodiments, the navigation application 220 is launched to execute in the background to handle waypoint information requests to for the watch face complications.

User context may be analyzed to determine triggers for requesting waypoint information at an increased frequency (e.g., in a non-extended mode) (1104). A variety of data sources may be analyzed to determine user context, including, but not limited to, the following: sensor data, application data, known user routines, known locations of interest, detection of entry and/or exit of a vehicle (e.g., loss of Bluetooth connection to vehicle), and/or any other user data. In an embodiment, the electronic device 102 selects a mode (e.g., extended or non-extended mode) based on conditions met in user contextual data, such as time or events, that indicate time interval values for capturing waypoint information. For example, if a user context includes the conditions of being in transit for a long period of time and/or limited cell service availability (e.g., weak, intermittent access, etc.), then such conditions potentially indicate a user is on a hike and waypoint information may proactively be captured to allow a user to retrace their steps.

In an embodiment, one or more conditions may be for determining a mode and/or a time period for duty cycling of requests for provision of waypoint information include, but are not limited to, the following: in transit (e.g., not stationary) motion classification, proximity to a waypoint position, mode of transport, threshold period of time without network access, sparse (e.g., not densely populated or density of manmade structures in the area, etc.) environment classification, threshold distance from a frequented location and/or location that is part of a user routine, and/or any other relevant user contextual data. While specific categories of conditions are provided, those with skill in the art will recognize that any other user contextual data may supplement and/or form the basis of an inference that the user will request historical positioning information for backtracking.

If the electronic device 102 receives a trigger for increasing frequency of duty cycling for provision of waypoint information requests (1104), then the waypoint information requests are sent continuously at a first time interval (e.g., 1 Hz or every 1 second) (1120). In an embodiment, the triggers for increasing frequency of duty cycling include conditions when the user needs precise, detailed information without delay, including, but not limited to, the following: emergency situations, backtracking to a waypoint position, a particular threshold distance from a waypoint position indicating a need to increase frequency, and/or based on mode of transport where the user is traveling at a constant speed such the user rapidly approaches a waypoint position (e.g., biking, running, not automotive vehicle, etc.). For example, a first waypoint threshold distance value for increasing a frequency of requests may be defined to represent a distance from the waypoint position such that when the user moves to be within the first waypoint threshold distance value from the waypoint position, the frequency of requests is increased. By way of further example, when the user is traveling at a constant speed, the user may need frequent, detailed, and/or precise updates because the distance and/or bearing values may be changing at a rapid rate and the first waypoint threshold distance value may be set at a distance value (e.g., 100 feet) so that the frequency of requests is increased when the user is within 100 feet of the waypoint position to provide the information.

After use of the first time interval (e.g., 1 second) is determined (1120), the electronic device 102 wakes the AP and/or the radio processor after expiration of the first time interval (1122). Optionally, a targeted view may be displayed, if the user depresses an affordance for the complication as shown in FIG. 4 (1124). The process for obtaining waypoint information continues with (1102) described. In some embodiments, the power savings mode changes may be a de-escalation from higher power state with more precise location monitoring (e.g., non-extended mode) to a low power state with coarse location monitoring (e.g., extended mode) to extend the life of the battery.

Continuing with FIG. 11, alternatively, if there is no trigger for increased frequency of waypoint information requests (1104), then the electronic device 102 determines which time period to use for duty cycling of waypoint information requests in an extended mode (1106). Conditions that trigger a decreased frequency (1106) include, but are not limited to, the following: a number of waypoint positions that are a threshold distance to the electronic device 102 (e.g., no waypoint positions, waypoint positions past a threshold distance such that a change in bearing and position would not alter the view of the waypoint relative to the user), motion classification (e.g., stationary), and/or mode of transportation (e.g., on a plane). In another example, a threshold for decreasing frequency may be defined. If the conditions are met for decreasing the frequency of requests (1116), then the second time period (e.g., thirty minutes) is used for obtaining waypoint information and waypoint information is obtained from other applications and/or services (1112). By way of example, if the user is on a plane, stationary, or there are no waypoint positions close enough to their current position that would be displayed with a noticeable change on the display for a time greater than the second period, then the second time period is used for duty cycling. The second time period is a greater period of time than the first time period. The process may either timeout (1114) such that the complication may deactivate and a user selectable interface element option with an affordance for the waypoint is displayed on the electronic device 102 (1126) or the process continues (1102). The complication may be deactivated at a user defined bedtime time and/or a predefined period of time for deactivating the complication.

Alternatively, continuing with FIG. 11, if a decreased frequency is not triggered by the current conditions (1106), then duty cycling is performed at a first period of time (1108). The first time period (e.g., 15 minutes) may be a greater time period value than the first time interval for increased frequency duty cycling in non-extended mode, but less than the second time period for decreased frequency duty cycling. In some embodiments, the first time period may be a period of time that the application processor and/or radio processor of the electronic device 102 is expected to wake during ordinary operation of the electronic device 102.

The duty cycling of requests provide intermittently received information at any time within the period (e.g., the first or second time period) such that the waypoint information (e.g., bearing and positioning information) is received at irregular intervals of time. For example, the intermittently received position fixes can be received at varying times within the N minute period and/or the position fixes are continuously requested and received for varying durations of time during the duty cycling period. The intermittent receipt of position fixes allows the application processor (AP) and/or a radio processor (e.g., GPS processor) to sleep in between requests and/or to handle requests by other applications. After the timer expires for the first time period, the electronic device 102 determines if the waypoint information is available from another service and/or application (1110), then uses waypoint information from another service and/or application, if available (1112). The process may either timeout (1114) such that the complication may deactivate and a user selectable interface element option with an affordance for the waypoint is displayed on the electronic device 102 (1126) or the process continues (1102). The complication may be deactivated at a user defined bedtime time and/or a predefined period of time for deactivating the complication.

Alternatively, continuing with FIG. 11, if no waypoint information is available from another service and/or application (1110), then the requests for provision of waypoint information are coalesced with other service requests and executed on the application processor and/or radio processer when another service wakes the processor(s). The process may either timeout (1114) such that the complication may deactivate and a user selectable interface element option with an affordance for the waypoint is displayed on the electronic device 102 (1126) or the process continues (1102). The complication may be deactivated at a user defined bedtime time and/or a predefined period of time for deactivating the complication.

FIG. 12 is a flow chart 1200 illustrating an approach for capturing waypoint information according to an embodiment. An electronic device receives an indication of an intention to interact with a waypoint complication an electronic device 102 (1201). The intention may be directly interacting with an affordance representing the waypoint, detection of a user lifting the electronic device 102 to trigger the electronic device 102 to wake and display the complication, conditions found in user context data that indicate the user may need the waypoint information, and/or any other indication of intent from the user for display of waypoint information.

Optionally, if the waypoint complication was previously deactivated, then the user may select an affordance to activate the waypoint complication (1202). After receiving an indication to activate the complication, the electronic device 102 may activate the complication view on the watch face and update the complication with waypoint information. The electronic device 102 sends the request to duty cycle waypoint information requests for the at least one waypoint and the duty cycle has the first time period based on the motion classification (1203). The duty cycle has a first time period based on a motion classification, and the waypoint information request may include at least one of a positioning request or a bearing request for display on the electronic device 102 user interface. The motion classification and the mode of transport may determine the frequency of requests that can provide bearing and positioning information commiserate with the speed at which the user may be traveling (including stationary) and/or a threshold distance to the waypoint position. A default setting for the duty cycling period for requests may be based on testing how often an electronic device processors (e.g., application processor and/or radio processors) wake with regular use depending on the type of device (e.g., smart watch, smartphone, etc.). The duty cycling may be increased if the user exceeds a predefined increase frequency threshold distance, during an emergency situation, and/or if traveling via a mode of transport (e.g., jogging, biking, etc.) that increasing the frequency would provide more accurate detail on bearing and positioning information, in some embodiments. Alternatively, the duty cycling may be decreased if the user is stationary and/or traveling by plane, and/or exceeds a decreased frequency threshold distance, in some embodiments. Although specific conditions for adjusting the frequency of requests is described, those with skill in the art will recognize that any condition met that indicates a user may need less or more waypoint information requests to provide needed accuracy and detail as weighed against the impact to device resources may factor into a decision for adjusting the frequency of requests for duty cycling. The electronic device 102 receives and displays the waypoint information in the waypoint complication (1204). The electronic device 102 deactivates the waypoint complication after a threshold period of time (1205). The complication may be deactivated at a user defined bedtime time and/or a predefined period of time for deactivating the complication.

FIG. 13 is a block diagram illustrating an exemplary API architecture, which may be used in some embodiments of the invention. As shown in FIG. 13, the API architecture 1300 includes the API-implementing component 1310 (e.g., an operating system, a library, a device driver, an API, an application program, software or other module) that implements the API 1320. The API 1320 specifies one or more functions, methods, classes, objects, protocols, data structures, formats and/or other features of the API-implementing component that may be used by the API-calling component 1330. The API 1320 can specify at least one calling convention that specifies how a function in the API-implementing component receives parameters from the API-calling component and how the function returns a result to the API-calling component. The API-calling component 1330 (e.g., an operating system, a library, a device driver, an API, an application program, software or other module), makes API calls through the API 1320 to access and use the features of the API-implementing component 1310 that are specified by the API 1320. The API-implementing component 1310 may return a value through the API 1320 to the API-calling component 1330 in response to an API call.

It will be appreciated that the API-implementing component 1310 may include additional functions, methods, classes, data structures, and/or other features that are not specified through the API 1320 and are not available to the API-calling component 1330. It should be understood that the API-calling component 1330 may be on the same system as the API-implementing component 1310 or may be located remotely and accesses the API-implementing component 1310 using the API 1320 over a network. While FIG. 13 illustrates a single API-calling component 1330 interacting with the API 1320, it should be understood that other API-calling components, which may be written in different languages (or the same language) than the API-calling component 1330, may use the API 1320.

The API-implementing component 1310, the API 1320, and the API-calling component 1330 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 14:
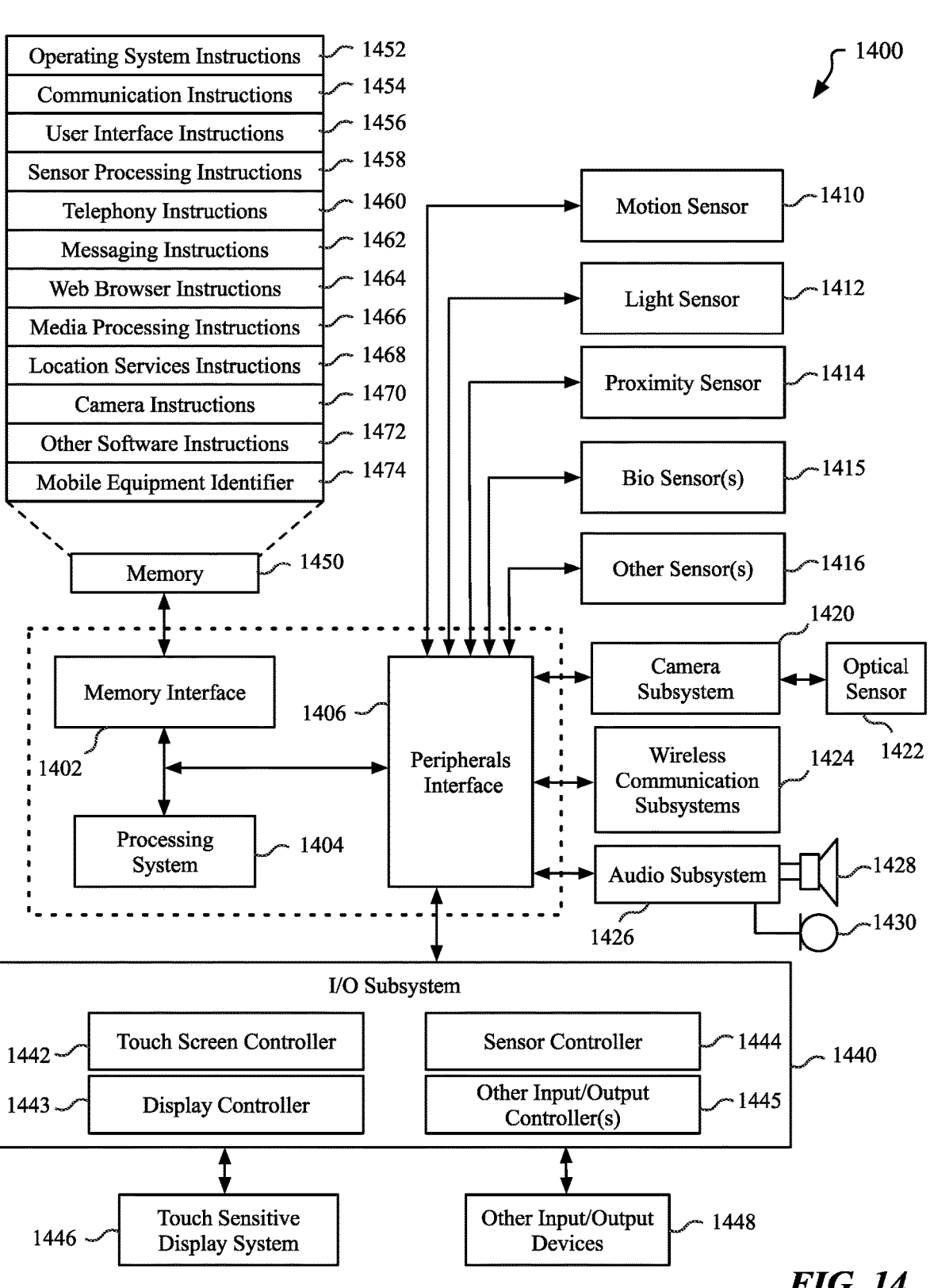
FIG. 14 is a block diagram of a device architecture for a mobile or embedded device, according to an embodiment.

FIG. 14 is a block diagram of a device architecture 1100 for a mobile or embedded device, according to an embodiment. The device architecture 1400 includes a memory interface 1402, a processing system 1404 including one or more data processors, image processors and/or graphics processing units, and a peripherals interface 1406. The various components can be coupled by one or more communication buses or signal lines. The various components can be separate logical components or devices or can be integrated in one or more integrated circuits, such as in a system on a chip integrated circuit.

The memory interface 1402 can be coupled to memory 1450, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1406 to facilitate multiple functionalities. For example, a motion sensor 1410, a light sensor 1412, and a proximity sensor 1414 can be coupled to the peripherals interface 1406 to facilitate the mobile device functionality. One or more biometric sensor(s) 1415 may also be present, such as a fingerprint scanner for fingerprint recognition or an image sensor for facial recognition. Other sensors 1416 can also be connected to the peripherals interface 1406, such as a positioning system (e.g., GPS receiver), a temperature sensor, or other sensing device, to facilitate related functionalities. In an embodiment, the positioning system may have a radio processor capable of solving navigation equations to determine user position, velocity, and/or time by processing the signals broadcast. A camera subsystem 1420 and an optical sensor 1422, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1424, which can include radio frequency receivers and transmitters and/or optical (e.g., infrared) receivers and transmitters. The specific design and implementation of the wireless communication subsystems 1424 can depend on the communication network(s) over which a mobile device is intended to operate. For example, a mobile device including the illustrated device architecture 1400 can include wireless communication subsystems 1424 designed to operate over a GSM network, a CDMA network, an LTE network, a Wi-Fi network, a Bluetooth network, or any other wireless network. In particular, the wireless communication subsystems 1424 can provide a communications mechanism over which a media playback application can retrieve resources from a remote media server or scheduled events from a remote calendar or event server.

An audio subsystem 1426 can be coupled to a speaker 1428 and a microphone 1430 to facilitate voice-enabled functions, such as voice recognition, voice replication, digital recording, and telephony functions. In smart media devices described herein, the audio subsystem 1426 can be a high-quality audio system including support for virtual surround sound.

The I/O subsystem 1440 can include a touch screen controller 1442 and/or other input controller(s) 1445. For computing devices including a display device, the touch screen controller 1442 can be coupled to a touch sensitive display system 1446 (e.g., touch-screen). The touch sensitive display system 1446 and touch screen controller 1442 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1446. Display output for the touch sensitive display system 1446 can be generated by a display controller 1443. In one embodiment, the display controller 1443 can provide frame data to the touch sensitive display system 1446 at a variable frame rate.

In one embodiment, a sensor controller 1444 is included to monitor, control, and/or processes data received from one or more of the motion sensor 1410, light sensor 1412, proximity sensor 1414, or other sensors 1416. The sensor controller 1444 can include logic to interpret sensor data to determine the occurrence of one of more motion events or activities by analysis of the sensor data from the sensors.

In one embodiment, the I/O subsystem 1440 includes other input controller(s) 1445 that can be coupled to other input/control devices 1448, such as one or more buttons, rocker switches, thumb-wheel, infrared port, USB port, and/or a pointer device such as a stylus, or control devices such as an up/down button for volume control of the speaker 1428 and/or the microphone 1430.

In one embodiment, the memory 1450 coupled to the memory interface 1402 can store instructions for an operating system 1452, including portable operating system interface (POSIX) compliant and non-compliant operating system or an embedded operating system. The operating system 1452 may include instructions for handling basic system services and for performing hardware dependent tasks. In some implementations, the operating system 1452 can be a kernel.

The memory 1450 can also store communication instructions 1454 to facilitate communicating with one or more additional devices, one or more computers and/or one or more servers, for example, to retrieve web resources from remote web servers. The memory 1450 can also include user interface instructions 1456, including graphical user interface instructions to facilitate graphic user interface processing.

Additionally, the memory 1450 can store sensor processing instructions 1458 to facilitate sensor-related processing and functions; telephony instructions 1460 to facilitate telephone-related processes and functions; messaging instructions 1462 to facilitate electronic-messaging related processes and functions; web browser instructions 1464 to facilitate web browsing-related processes and functions; media processing instructions 1466 to facilitate media processing-related processes and functions; location services instructions including GPS and/or navigation instructions 1468 and Wi-Fi based location instructions to facilitate location based functionality; camera instructions 1470 to facilitate camera-related processes and functions; and/or other software instructions 1472 to facilitate other processes and functions, e.g., security processes and functions, and processes and functions related to the systems. The memory 1450 may also store other software instructions such as web video instructions to facilitate web video-related processes and functions; and/or web shopping instructions to facilitate web shopping-related processes and functions. In some implementations, the media processing instructions 1466 are divided into audio processing instructions and video processing instructions to facilitate audio processing-related processes and functions and video processing-related processes and functions, respectively. A mobile equipment identifier, such as an International Mobile Equipment Identity (IMEI) 1474 or a similar hardware identifier can also be stored in memory 1450.

Each of the above identified instructions and applications can correspond to a set of instructions for performing one or more functions described above. These instructions need not be implemented as separate software programs, procedures, or modules. The memory 1450 can include additional instructions or fewer instructions. Furthermore, various functions may be implemented in hardware and/or in software, including in one or more signal processing and/or application specific integrated circuits.

Figure 15:
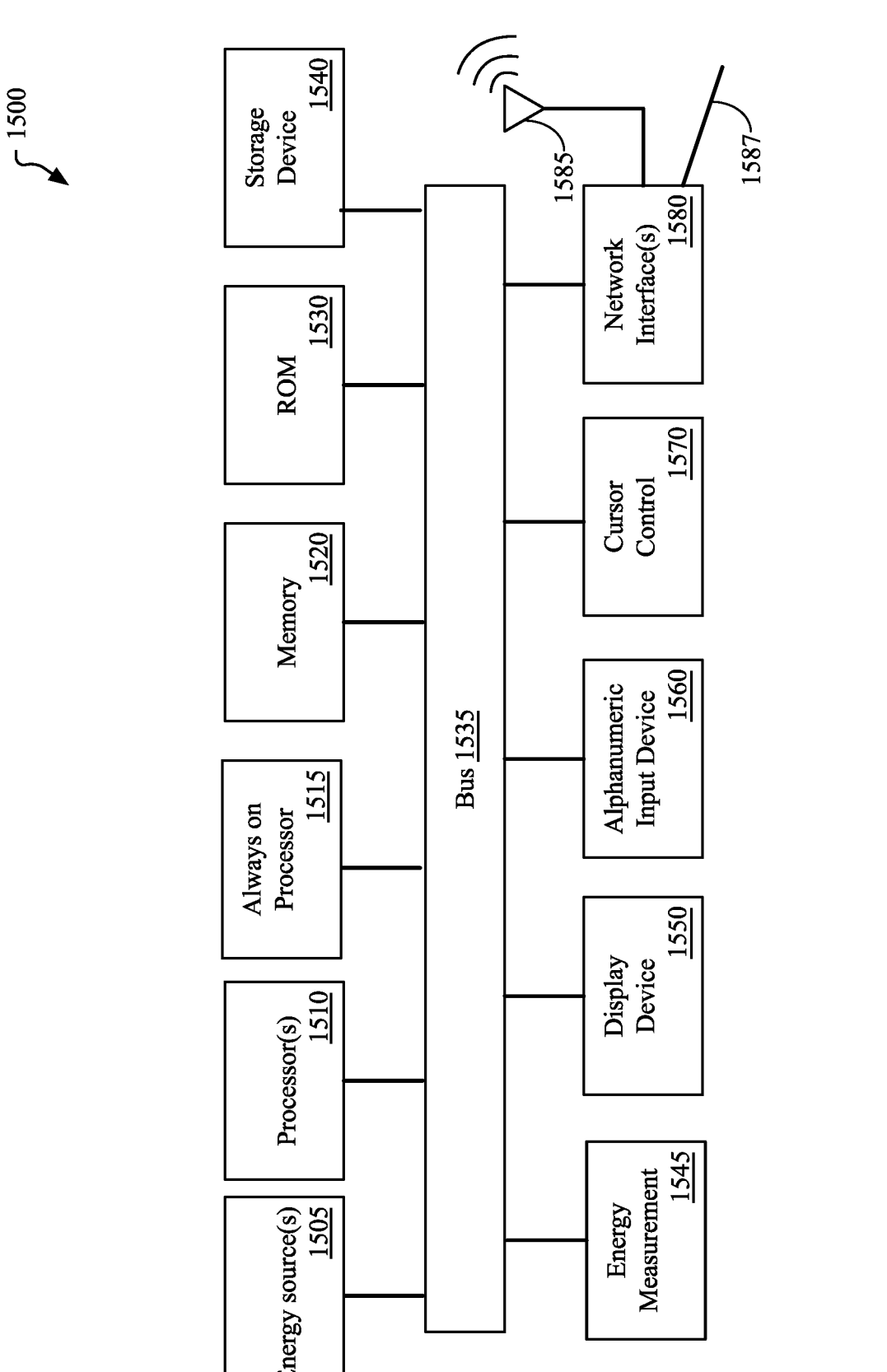
FIG. 15 is a block diagram of a computing system, according to an embodiment.

FIG. 15 is a block diagram of a computing system 1500, according to an embodiment. The illustrated computing system 1500 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1500 can be used to provide the computing device and/or a server device to which the computing device may connect.

The computing system 1500 includes bus 1535 or other communication device to communicate information, and processor(s) 1510 coupled to bus 1535 that may process information. While the computing system 1500 is illustrated with a single processor, the computing system 1500 may include multiple processors, low power processors, and/or co-processors. The computing system 1500 further may include memory 1520 in the form of random access memory (RAM) or other dynamic storage device coupled to the bus 1535. The memory 1520 may store information and instructions that may be executed by processor(s) 1510. In an embodiment, the memory 1520 may store instructions that may be executed by a low power processor 1515, such as the AOP. In an embodiment, the low power processor 1515 may be a component of a system on a chip (SOC) that remains powered when the remainder of the SOC is powered off. Implementations of the low power processor 1515 may be found in U.S. Pat. No. 11,079,261, which is herein incorporated by reference. The memory 1520 may also be main memory that is used to store temporary variables or other intermediate information during execution of instructions by the processor(s) 1510.

The computing system 1500 may also include read only memory (ROM) 1530 and/or another data storage device 1540 coupled to the bus 1535 that may store information and instructions for the processor(s) 1510. The data storage device 1540 can be or include a variety of storage devices, such as a flash memory device, a magnetic disk, or an optical disc and may be coupled to computing system 1500 via the bus 1535 or via a remote peripheral interface.

The computing system 1500 may also be coupled, via the bus 1535, to a display device 1550 to display information to a user. The computing system 1500 can also include an alphanumeric input device 1560, including alphanumeric and other keys, which may be coupled to bus 1535 to communicate information and command selections to processor(s) 1510. Another type of user input device includes a cursor control 1570 device, such as a touchpad, a mouse, a trackball, or cursor direction keys to communicate direction information and command selections to processor(s) 1510 and to control cursor movement on the display device 1550. The computing system 1500 may also receive user input from a remote device that is communicatively coupled via one or more network interface(s) 1580.

The computing system 1500 further may include one or more network interface(s) 1580 to provide access to a network, such as a local area network. The network interface(s) 1580 may include, for example, a wireless network interface having antenna 1585, which may represent one or more antenna(e). The computing system 1500 can include multiple wireless network interfaces such as a combination of Wi-Fi, Bluetooth®, near field communication (NFC), and/or cellular telephony interfaces. The network interface(s) 1580 may also include, for example, a wired network interface to communicate with remote devices via network cable 1587, which may be, for example, an Ethernet cable, a coaxial cable, a fiber optic cable, a serial cable, or a parallel cable.

In one embodiment, the network interface(s) 1580 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1580 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1500 can further include one or more energy sources 1505 and one or more energy measurement systems 1545. Energy sources 1505 can include an AC/DC adapter coupled to an external power source, one or more batteries, one or more charge storage devices, a USB charger, or other energy source. Energy measurement systems include at least one voltage or amperage measuring device that can measure energy consumed by the computing system 1500 during a predetermined period of time. Additionally, one or more energy measurement systems can be included that measure, e.g., energy consumed by a display device, cooling subsystem, Wi-Fi subsystem, or other frequently used or high-energy consumption subsystem.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A method comprising:
receiving a request to display at least one waypoint user interface object on a user interface of an electronic device;
sending a request to duty cycle waypoint information requests for the at least one waypoint user interface object, wherein the duty cycle has a first time period based on a motion classification, and wherein a waypoint information request comprises at least one of a positioning request or a bearing request;
upon expiration of the first time period:
determining not to wake an application processor based on receipt of waypoint information from another application during the first time period; and
coalescing the waypoint information request with other process requests; and
receiving waypoint information and displaying the received waypoint information on the user interface.

2. The method of claim 1, further comprising:
receiving an indication that the electronic device is a threshold distance from a position associated with the waypoint information, and wherein
sending the request to duty cycle the waypoint information requests comprises sending the request at a time interval that is shorter than the first time period.

3. The method of claim 2, further comprising:
waking the application processor to send the at least one of the positioning request or the bearing request.

4. The method of claim 1, further comprising:
receiving an indication that the electronic device is settled;
sending a request to duty cycle the waypoint information requests for a second time period; and requesting waypoint information from the another application during the second time period.

5. The method of claim 1, wherein the motion classification for the electronic device is in transit.

6. The method of claim 1, further comprising:
receiving a request for a targeted view of the waypoint user interface object; and
sending a request to duty cycle the waypoint information requests for a second time period, wherein the second time period is shorter than the first time period.

7. A method comprising:
receiving an indication of intention to interact with a waypoint complication representing a waypoint position on an electronic device;
activating the waypoint complication by updating a complication view with waypoint information;
sending a request to duty cycle waypoint information requests for the waypoint position, wherein the duty cycle has a first time period based on a motion classification and a distance from the waypoint position;
upon expiration of the first time period:
determining not to wake an application processor based on receipt of the waypoint position from another application during the first time period; and
coalescing the waypoint information requests with other process requests; and
receiving and displaying the waypoint information in the waypoint complication.

8. The method of claim 7, wherein activating the waypoint complication includes executing a navigation application to provide the waypoint information.

9. The method of claim 7, further comprising:
receiving a request for a particular waypoint for display on the electronic device.

10. The method of claim 7, wherein the indication of intention to interact with the waypoint complication representing the waypoint position comprises receiving a user selection of the waypoint complication.

11. The method of claim 7, wherein the indication of intention to interact with the waypoint complication representing the waypoint position comprises lifting the electronic device.

12. The method of claim 7, further comprising:
deactivating the waypoint complication at an expiration of a timer set for a threshold period of time.

13. The method of claim 12, wherein the threshold period of time is a bedtime selected by a user.

14. The method of claim 7, wherein the motion classification for the electronic device is in transit.

15. The method of claim 7, further comprising:
adjusting the first time period of the duty cycle based on a mode of transport for the motion classification.

16. The method of claim 7, further comprising:
receiving an indication that the electronic device is a threshold distance from a position associated with the waypoint position, and wherein
sending the request to duty cycle the waypoint information requests comprises sending the request at a time interval that is shorter than the first time period.

17. The method of claim 7, further comprising:
receiving an indication that the electronic device is settled;
sending a request to duty cycle the waypoint information requests for a second time period; and
requesting other waypoint information from another application during the second time period.

US 12,663,283 B2

27

28

18. A system, comprising:

a memory configured to store computer-executable instructions; and one or more processors configured to access the memory and execute the computer-executable instructions to at least:

receive a request to display at least one waypoint user interface object on a user interface of an electronic device;

send a request to duty cycle waypoint information requests for the at least one waypoint user interface object, wherein the duty cycle has a first time period based on a motion classification, and wherein a waypoint information request comprises at least one of a positioning request or a bearing request;

upon expiration of the first time period:

determine not to wake an application processor based on receipt of waypoint information from another application during the first time period; and coalesce the waypoint information request with other process requests; and receive waypoint information and displaying the received waypoint information on the user interface.

* * * * *